United States Patent
Park et al.

(10) Patent No.: US 11,424,447 B2
(45) Date of Patent: Aug. 23, 2022

(54) POSITIVE ELECTRODE ACTIVE MATERIAL FOR LITHIUM SECONDARY BATTERY AND METHOD FOR PREPARING THE SAME

(71) Applicant: LG Chem, Ltd., Seoul (KR)

(72) Inventors: Younguk Park, Daejeon (KR); Tae Gu Yoo, Daejeon (KR); Jintae Hwang, Daejeon (KR); Wang Mo Jung, Daejeon (KR); Sungbin Park, Daejeon (KR)

(73) Assignee: LG Energy Solution, Ltd.

( * ) Notice: Subject to any disclaimer, the term of this patent is extended or adjusted under 35 U.S.C. 154(b) by 285 days.

(21) Appl. No.: 16/496,167

(22) PCT Filed: Nov. 22, 2018

(86) PCT No.: PCT/KR2018/014453
§ 371 (c)(1),
(2) Date: Sep. 20, 2019

(87) PCT Pub. No.: WO2019/103488
PCT Pub. Date: May 31, 2019

(65) Prior Publication Data
US 2020/0161650 A1 May 21, 2020

(30) Foreign Application Priority Data
Nov. 22, 2017 (KR) .......... 10-2017-0156743
Nov. 21, 2018 (KR) .......... 10-2018-0144888

(51) Int. Cl.
*H01B 1/08* (2006.01)
*H01M 4/525* (2010.01)
(Continued)

(52) U.S. Cl.
CPC .............. *H01M 4/525* (2013.01); *H01B 1/08* (2013.01); *H01M 4/0471* (2013.01);
(Continued)

(58) Field of Classification Search
CPC ........ H01B 1/08; H01M 4/485; H01M 4/505; H01M 4/525; H01M 10/0525
See application file for complete search history.

(56) References Cited

U.S. PATENT DOCUMENTS

| 5,599,642 A | 2/1997 | Toshiro et al. |
| 8,945,770 B2 * | 2/2015 | Koo ........ C01G 53/42 |
| | | 429/218.1 |

(Continued)

FOREIGN PATENT DOCUMENTS

| CN | 102210045 A | 10/2011 |
| CN | 102479951 A | 5/2012 |

(Continued)

OTHER PUBLICATIONS

English language translation of PCT/ISA/237 (PCT/KR2018/014453) dated Mar. 2019).*

(Continued)

*Primary Examiner* — Mark Kopec
(74) *Attorney, Agent, or Firm* — Lerner, David, Littenberg, Krumholz & Mentlik, LLP

(57) ABSTRACT

A positive electrode active material for a lithium secondary battery is provided having a secondary particle formed by agglomerating a plurality of polycrystalline primary particles including a lithium composite metal oxide of Chemical Formula 1, wherein an average crystallite size of the primary particle is 180 to 400 nm, a particle size D50 of the primary particle is 1.5 to 3µm, and the primary particle is doped or surface-coated with at least one element M selected from the group consisting Al, Ti, Mg, Zr, Y, Sr, and B in an amount of 3,800 to 7,000 ppm:

$Li_a(Ni_xMn_yCo_zA_w)O_{2+b}$      [Chemical Formula 1].

17 Claims, 17 Drawing Sheets

(51) Int. Cl.
  *H01M 4/485* (2010.01)
  *H01M 4/04* (2006.01)
  *H01M 4/505* (2010.01)
  *H01M 10/0525* (2010.01)
  *H01M 4/02* (2006.01)

(52) U.S. Cl.
  CPC .......... *H01M 4/485* (2013.01); *H01M 4/505* (2013.01); *H01M 10/0525* (2013.01); *H01M 2004/028* (2013.01)

(56) References Cited

U.S. PATENT DOCUMENTS

| | | |
|---|---|---|
| 2009/0305136 A1 | 12/2009 | Yada et al. |
| 2012/0034516 A1 | 2/2012 | Koo et al. |
| 2013/0209885 A1 | 8/2013 | Paulsen et al. |
| 2015/0249248 A1 | 9/2015 | Ishizaki et al. |
| 2015/0357627 A1 | 12/2015 | Kwak et al. |
| 2016/0181593 A1 | 6/2016 | Jin et al. |
| 2016/0322627 A1 | 11/2016 | Yoshida et al. |
| 2017/0125808 A1 | 5/2017 | Blangero et al. |
| 2017/0187065 A1 | 6/2017 | Inoue et al. |
| 2017/0250396 A1 | 8/2017 | Hiratsuka |
| 2018/0026265 A1* | 1/2018 | Kajiyama ......... H01M 10/0525 429/223 |
| 2018/0145321 A1* | 5/2018 | Yamauchi ............ H01M 4/505 |
| 2018/0215629 A1* | 8/2018 | Honma ............... H01M 10/052 |
| 2018/0287135 A1 | 10/2018 | Shin et al. |
| 2019/0020022 A1 | 1/2019 | Jeong et al. |
| 2019/0115596 A1 | 4/2019 | Kajiyama et al. |
| 2020/0303776 A1 | 9/2020 | Watanabe |

FOREIGN PATENT DOCUMENTS

| | | |
|---|---|---|
| CN | 104704659 A | 6/2015 |
| CN | 105453313 A | 3/2016 |
| EP | 2352190 A2 | 8/2011 |
| GB | 2533720 A | 6/2016 |
| JP | 2009224307 A | 10/2009 |
| JP | 2012113823 A | 6/2012 |
| JP | 2013539169 A | 10/2013 |
| JP | 2015144108 A | 8/2015 |
| JP | 2016509567 A | 3/2016 |
| JP | 2016139569 A | 8/2016 |
| JP | 2016155696 A | 9/2016 |
| JP | 2017525089 A | 8/2017 |
| JP | 2017157548 A | 9/2017 |
| JP | 2017188428 A | 10/2017 |
| KR | 20100052419 A | 5/2010 |
| KR | 20160128238 A | 11/2016 |
| KR | 20170012248 A | 2/2017 |
| KR | 20170063395 A | 6/2017 |
| KR | 20170075596 A | 7/2017 |
| KR | 20170103389 A | 9/2017 |
| WO | 2014061653 A1 | 4/2014 |
| WO | 2017095134 A1 | 6/2017 |
| WO | 2017159267 A1 | 9/2017 |

OTHER PUBLICATIONS

Extended European Search Report including Written Opinion for Application No. EP18882196.1, dated Apr. 1, 2020, pp. 1-5.
International Search Report for Application No. PCT/KR2018/014453, dated Mar. 11, 2019, pp. 1-2.
Search Report dated Jan. 13, 2022 from the Office Action for Chinese Application No. 201880018031.6 dated Jan. 29, 2022, 3 pgs.

* cited by examiner

POSITIVE ELECTRODE ACTIVE MATERIAL FOR LITHIUM SECONDARY BATTERY AND METHOD FOR PREPARING THE SAME

CROSS-REFERENCE TO RELATED APPLICATIONS

The present application is a national stage entry under 35 U.S.C. § 371 of PCT/KR2018/014453 filed on Nov. 22, 2018, which claims priority to Korean Patent Application No. 10-2017-0156743 filed in the Korean Intellectual Property Office on Nov. 22, 2017, and Korean Patent Application No. 10-2018-0144888 filed in the Korean Intellectual Property Office on Nov. 21, 2018, the entire contents of which are incorporated herein by reference.

TECHNICAL FIELD

The present invention relates to a positive electrode active material for a lithium secondary battery and a method for preparing the same capable of improving a high-voltage performance and volume change durability of the lithium secondary battery during charging and discharging through minimization of an interface between the positive electrode active material and an electrolyte.

BACKGROUND ART

In accordance with technological developments and increase demands for mobile devices, the demand for a secondary battery has increased rapidly as an energy resource. Among these secondary batteries, a lithium secondary battery having a high energy density and voltage, a long lifespan, and a low self-discharge rate is commercially available and widely used.

Recently, attempts to increase cost competitiveness by replacing lithium cobalt oxide (LCO) which is currently mainly used as a positive electrode active material for a small size battery with an inexpensive lithium nickel cobalt manganese oxide (NCM) have been continuously conducted due to the soaring cost of cobalt (Co).

NCM is driven in a commercial cell at an upper limit voltage of 4.2 V. When NCM is used in a small-sized device at an upper limit voltage of 4.35 V, performance thereof is deteriorated in comparison to LCO. The reason is that NCM becomes more unstable in a high state of charge (SOC) at the same upper limit voltage in comparison to LCO due to a large amount of lithium (Li) deintercalation. As a result, when NCM is used at a high voltage of 4.35 V or more, side reaction between a positive electrode active material and an electrolyte is increased in comparison to LCO, which leads to deterioration of battery performance.

Therefore, as an inexpensive positive electrode active material capable of being driven at a high voltage, development of an NCM positive electrode active material realizing a low side reaction with an electrolyte in a high SOC is required.

DISCLOSURE

Technical Problem

The present invention has been made in an effort to provide a positive electrode active material for a lithium secondary battery and a method for preparing the same having advantages of improving a high-voltage performance and volume change durability of the lithium secondary battery during charging and discharging through minimization of an interface between the positive electrode active material and an electrolyte.

Technical Solution

An exemplary embodiment of the present invention provides a positive electrode active material for a lithium secondary battery, the positive electrode active material being a secondary particle formed by agglomerating a plurality of polycrystalline primary particles including a lithium composite metal oxide of Chemical Formula 1, wherein an average crystallite size of the primary particle is 180 to 400 nm, a particle size D50 of the primary particle is 1.5 to 3 μm, and the primary particle is doped or surface-coated with at least one element M selected from the group consisting of Al, Ti, Mg, Zr, Y, Sr, and B in an amount of 3,800 to 7,000 ppm:

$$Li_a(Ni_xMn_yCo_zA_w)O_{2+b}$$  [Chemical Formula 1]

in Chemical Formula 1,

A is at least one element selected from the group consisting of W, V, Cr, Nb, and Mo, and $0.95 \leq a \leq 1.2$, $0 \leq b \leq 0.02$, $0 \leq x \leq 1$, $0 \leq y \leq 0.4$, $0 \leq z \leq 1$, $0 \leq w \leq 0.2$, and $x+y+z+w=1$.

Another exemplary embodiment of the present invention provides a method for preparing the positive electrode active material for a lithium secondary battery, the method including: mixing a precursor for preparation of a lithium composite metal oxide of Chemical Formula 1 with a lithium raw material and a raw material of an element M (M including at least one element selected from the group consisting of Al, Ti, Mg, Zr, Y, Sr, and B), and excessively calcining the mixture at a temperature of 960° C. or more; or mixing a precursor for preparation of a lithium composite metal oxide of Chemical Formula 1 with a lithium raw material, excessively calcining the mixture at a temperature of 960° C. or more, mixing the lithium composite metal oxide thus obtained with a raw material of an element M (M including at least one element selected from the group consisting of Al, Ti, Mg, Zr, Y, Sr, and B), and performing a heat treatment at a temperature of 200 to 800° C., wherein a particle size D50 of the precursor is 8 μm or more.

Yet another exemplary embodiment of the present invention provides a positive electrode for a lithium secondary battery including the positive electrode active material and a lithium secondary battery.

Advantageous Effects

The positive electrode active material for a lithium secondary battery according the present invention is capable of improving a high-voltage performance and volume change durability during charging and discharging through minimization of an interface between the positive electrode active material and an electrolyte when applied to the battery.

MODE FOR INVENTION

Figure 1:
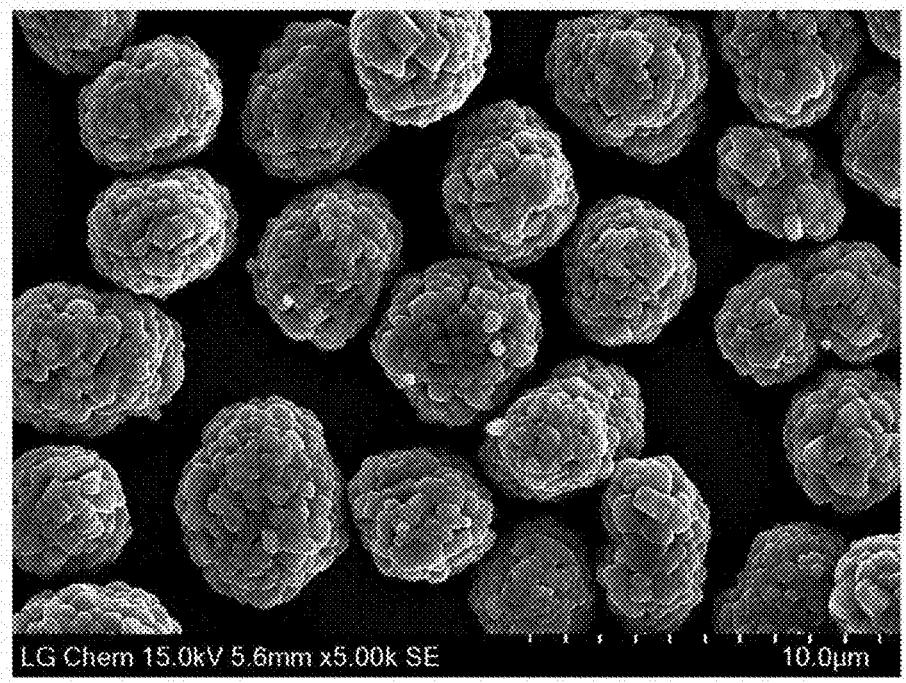
FIGS. 1 and 2 are photographs obtained with a scanning electron microscope (SEM) of the positive electrode active materials prepared in Comparative Example 1 and Reference Example 1.

Hereinafter, the present invention will be described in more detail in order to assist in the understanding of the present invention.

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode.

Hereinafter, a method for preparing a positive electrode active material for a lithium secondary battery according to an embodiment of the present invention, a positive electrode active material prepared by the method, a positive electrode including the positive electrode active material, and a lithium secondary battery will be described.

The positive electrode active material for a lithium secondary battery according to an embodiment of the present invention is a secondary particle formed by agglomerating a plurality of polycrystalline primary particles including a lithium composite metal oxide of Chemical Formula 1, in which an average crystallite size of the primary particle is 180 to 400 nm, a particle size D50 of the primary particle is 1.5 to 3 μm, and the primary particle is doped or surface-coated with at least one element M selected from the group consisting of Al, Ti, Mg, Zr, Y, Sr, and B in an amount of 3,800 to 7,000 ppm:

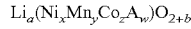  [Chemical Formula 1]

$$Li_a(Ni_xMn_yCo_zA_w)O_{2+b}$$ [Chemical Formula 1]

in Chemical Formula 1,

A is at least one element selected from the group consisting of W, V, Cr, Nb, and Mo, and $0.95 \leq a \leq 1.2$, $0 \leq b \leq 0.02$, $0 < x < 1$, $0 < y \leq 0.4$, $0 < z < 1$, $0 \leq w < 0.2$, and $x+y+z+w=1$.

As described above, when the positive electrode active material according to an embodiment of the invention is prepared, a single particle (primary particle) is made by excessively calcining a precursor, and the single particle is formed into a secondary particle by increasing a particle size of the precursor, such that the positive electrode active material may have a minimized interfacial area with an electrolyte. In addition, by doping or surface-coating the primary particle with an element capable of stabilizing a surface structure, high-voltage performance may be improved and durability may be improved due to decrease of a volume change during charging and discharging.

In detail, the positive electrode active material according to an embodiment of the invention is a secondary particle formed by agglomerating a plurality of primary particles and the primary particle is a polycrystalline single particle formed by being excessively calcined.

In the present invention, the term "polycrystal" refers to a crystalline body composed of two or more crystal grains. An average crystallite size of the crystal grains is in a range of 180 to 400 nm, more specifically, in a range of 180 to 300 nm, and more specifically, in a range of 180 to 250 nm. In this case, an average crystallite size of the primary particles may be quantitatively analyzed by using X-ray diffraction analysis (XRD). In detail, the average crystallite size of the primary particles may be quantitatively analyzed by putting the primary particles in a holder and analyzing diffraction patterns obtained by irradiation of the particles with X-ray (Cu-Kα X-ray).

Excellent capacity characteristics of the battery may be exhibited as the crystal grains in the primary particle have an average crystallite size within the range described above. In a case where the average crystallite size of the primary particles is less than 180 nm, it is difficult for the primary particle to have a perfect shape as a single particle. As a result, an interfacial area between the positive electrode active material and the electrolyte becomes large and a loss of contact between the primary particles may occur due to a volume change during charging and discharging. In addition, in a case where the average crystallite size of the primary particles exceeds 400 nm, capacity of the battery may be deteriorated due to an excessive increase of resistance.

Meanwhile, since the lithium composite metal oxide of Chemical Formula 1 has a layered crystal lattice structure, excellent charge and discharge capacity characteristics may be exhibited when applied to the battery, and a gas generation amount may be significantly reduced during high-temperature storage of the battery. In addition, since manganese (Mn) is included in the lithium composite metal oxide in a low content of 0.4 mole ratio or less based on a total number of moles of metal elements except lithium included in the lithium composite metal oxide, there is no concern that manganese is eluted in comparison to a conventional lithium composite metal oxide including an excess Mn at 0.5 mole ratio or more. As a result, more excellent lifespan characteristics may be exhibited.

In Chemical Formula 1, a, x, y, z, and w represent mole ratios of the respective elements in the lithium composite metal oxide.

Lithium (Li) may be included in the lithium composite metal oxide of Chemical Formula 1 in an amount corresponding to a, specifically, $0.95 \leq a \leq 1.2$. When a is less than 0.95, output characteristics of the battery may be deteriorated due to increase of interfacial resistance generated at a contact interface between the electrolyte and the positive electrode active material including the lithium composite metal oxide. Meanwhile, when a exceeds 1.2, initial discharge capacity of the battery is reduced or a large amount of Li by-products are generated on a surface of the positive electrode active material. Therefore, gas may be largely generated when the battery is driven at a high temperature. In consideration of combination effect with a characteristic structure of the active material according to an embodiment of the invention, more specifically, the a may be $0.98 \leq a < 1.05$ or $a=1$.

In addition, in the lithium composite metal oxide of Chemical Formula 1, nickel (Ni) is an element which contributes to high potential and high capacity of the secondary battery. Nickel may be included in an amount corresponding to x, specifically, in the content of $0 < x < 1$, where $x+y+z+w=1$. When x is zero, charge and discharge capacity characteristics may be deteriorated. When x exceeds 1, a structure and heat stability of the active material may be deteriorated. Accordingly, lifespan characteristics may be deteriorated. In consideration of high potential and high capacity efficiency according to control in the content of nickel, the nickel may be included, specifically, in the content of $0.5 \leq x < 1$, and more specifically, $0.5 \leq x \leq 0.8$, where $x+y+z+w=1$.

In addition, in the lithium composite metal oxide of Chemical Formula 1, manganese (Mn) is an element which contributes to improvement of heat stability of the active material. Manganese may be included in an amount corresponding to y, specifically, in the content of $0 < y \leq 0.4$, where $x+y+z+w=1$. When y is zero, heat stability may be deteriorated and a gas generation amount may be increased during high-temperature storage of the battery. When y exceeds 0.4, lifespan characteristics may be deteriorated, discharging resistance of the battery may be rapidly increased, and the gas generation amount may be increased during high-temperature storage of the battery due to increase of an elution amount of manganese. In consideration of improvement effects of heat stability and lifespan characteristics of the active material according to control in the content of manganese, the manganese may be included, specifically, in the content of $0.1 \leq y < 0.4$, and more specifically, $0.1 \leq y \leq 0.3$, where $x+y+z+w=1$.

In addition, in the lithium composite metal oxide of Chemical Formula 1, cobalt (Co) is an element which contributes to charging and discharging cycle characteristics of the active material. Cobalt may be included in an amount corresponding to z, specifically, in the content of $0 < z < 1$, where $x+y+z+w=1$. When z is zero, charge and discharge capacity of the battery may be deteriorated due to reduction of structure stability and lithium ion conductivity. When z is 1, since a driving voltage of the positive electrode active material is increased, charge and discharge capacity of the battery may be deteriorated at a predetermined upper limit voltage. In consideration of effect of improving cycle characteristics of the active material according to control in the content of cobalt, the cobalt may be included, specifically, in the content of $0.1 \leq z < 0.4$, and more specifically, $0.1 \leq z \leq 0.3$.

In addition, the positive electrode active material according to an embodiment of the invention may further selectively include an additional element A in addition to the metal element in order to enhance the battery performance through improvement of thermal/structural stability of the positive electrode active material.

The element A serves to improve thermal/structural stability of the active material by substituting Ni, Co, or Mo. In detail, the element A may be at least one selected from the group consisting of W, V, Cr, Nb, and Mo, and may be W or Mo among these elements from the viewpoint of excellent reactivity with lithium and stability improvement effect on the active material.

In a case where the element A is further included, the element A may be included in the lithium composite metal oxide in an amount corresponding to w, specifically, $0 < x \leq 0.2$. When w exceeds 0.2, charge and discharge capacity of the battery may be deteriorated due to decrease of the metal element contributing to a reduction reaction. In addition, in consideration of significant improvement effect according to control in a substitution amount of element A to be included in the lithium composite metal oxide, w may be $0 < x \leq 0.05$ or $0.01 \leq x \leq 0.05$.

More specifically, the lithium composite metal oxide of Chemical Formula 1 may be a compound having a layered crystal lattice structure, in which $a=1$, $0 \leq b \leq 0.02$, $0.5 \leq x < 1$, $0.1 \leq y < 0.4$, $0.1 \leq z < 0.4$, $0 \leq w \leq 0.05$, and $x+y+z+w=1$. Furthermore specifically, the compound having the layered crystal lattice structure may be $LiNi_{0.8}Co_{0.1}Mn_{0.1}O_2$, $LiNi_{0.6}Co_{0.2}Mn_{0.2}O_2$, $LiNi_{0.5}Co_{0.2}Mn_{0.3}O_2$, $LiNi_{0.5}Co_{0.3}Mn_{0.2}O_2$, or the like, and any one or a mixture of two or more thereof may be included in the positive electrode active material.

Meanwhile, in the positive electrode active material according to an embodiment of the invention, the primary particle may be doped or surface-coated with at least one element M selected from the group consisting of Al, Ti, Mg, Zr, Y, Sr, and B and may be doped and surface-coated with at least one element M selected from the group consisting of Al, Ti, Mg, Zr, Y, Sr, and B simultaneously.

In the case of doping, similar to a preparation method to be described below, the positive electrode active material is prepared by mixing a precursor for preparation of a Ni—Co—Mn-containing lithium composite metal oxide with a lithium raw material and a raw material of an element M, and excessively calcining the mixture. At this time, during the excessive calcination, the element M derived from the raw material of the element M is doped into an empty space in a crystal lattice structure of the compound of Chemical Formula 1 constituting the primary particles.

In a case where the primary particle is doped with the element M, the element M may be positioned at the surface of the primary particle only, may be positioned with a concentration gradient decreasing from the surface of the primary particle toward the center thereof, and may be uniformly present over the entire primary particle depending on positional preference of the element M.

Further, in the case of coating, a coated layer including the element M may be formed on a surface of the positive electrode active material by mixing a precursor for preparation of a Ni—Co—Mn-containing lithium composite metal oxide with a lithium raw material, excessively calcining the mixture, mixing the prepared positive electrode active material with a raw material of an element M, and performing a heat treatment. In this case, the element M may be included in the form of oxides.

In detail, in a case where the primary particle is coated with the element M, the primary particle may include a coated layer including the element M which is formed entirely or partially on the surface thereof. In addition, the primary particle is doped with the element M, the primary particle may include the lithium composite metal oxide of the Chemical Formula 1 doped with the element M, for example, a lithium composite metal oxide of the Chemical Formula 2:

$$Li_a(Ni_xMn_yCo_zA_w)M_vO_{2+b}$$ [Chemical Formula 2]

in Chemical Formula 2, A, a, b, x, y, z, and w are the same as defined above,

M includes at least one element selected from the group consisting of Al, Ti, Mg, Zr, Y, Sr, and B, v is an independent variable indicating a doping amount of element M and is determined in a range of the content of the element M to be included in the finally prepared positive electrode active material, specifically, in a range of 3,800 to 7,000 ppm.

In a case where the primary particle is doped or surface-coated with such an element M, high voltage characteristics of the battery may be further improved due to a primary active material structure, in particular, stability of a surface structure of the active material. Among these elements, in consideration of an excellent structural stabilizing effect of a surface, the element M includes at least one element selected from the group consisting of Zr, Mg, Ti, and Al, and specifically, may be Zr.

Further, the element M may be doped or surface-coated in an amount of 3,800 to 7,000 ppm based on a total weight of the positive electrode active material. Alternatively, doping and surface-coating may be performed simultaneously within the range described above. When the content of the element M is less than 3,800 ppm, the structural stabilizing effect according to including of the element M may be trivial. When the content of the element M exceeds 7,000 ppm, rather, the charge and discharge capacity may be deteriorated and the resistance may be increased due to an excess element M. In consideration of an excellent improvement effect according to control in the content of the element M, the element M may be coated or doped in an amount of 4,000 to 6,500 ppm. In addition, in the case where doping and surface-coating are performed simultaneously, it is preferable that the content of the element M to be doped in the range of the total content of the element M is higher than that of the element M to be coated, specifically, the content of the element M to be doped may be 2,500 to 6,000 ppm and the content of the element M to be coated may be 1,000 to 2,000 ppm. When the doping and surface-coating is performed within the content range described above, implementation effect may be further improved according to position optimization of the element M.

Meanwhile, in the present invention, the content of the element M in the positive electrode active material may be measured by using an inductively coupled plasma spectrometer (ICP).

A particle size D50 of the primary particle having the configuration as described above may be 1.5 to 3 μm.

The primary particle of the present invention has a larger particle size in comparison to a case in which a particle size D50 of a primary particle in a conventional NCM-based active material on a secondary particle having 12 μm is less than 1 μm, and more specifically, 0.5 to 1 μm. As described above, a Brunauer-Emmett-Teller (BET) specific surface area of the active material decreases as the particle size D50 of the primary particle increases. As a result, the interfacial area between the electrolyte and the positive electrode active material is minimized, therefore side reactions are reduced and battery performance may be enhanced. In detail, in the present invention, when the particle size D50 of the primary particle is less than 1.5 μm, reduction effect of the interfacial area between the electrolyte and the positive electrode active material may be deteriorated, and when the particle size D50 of the primary particle exceeds 3 μm, an energy density per volume may be deteriorated due to decrease of a pellet density of the positive electrode active material. In consideration of improvement effect according to control in the size of the primary particle, the particle size D50 of the primary particle may be 2 to 3 μm.

Meanwhile, in the present invention, D50 may be defined as a particle size at a point corresponding to 50% of a particle number cumulative distribution depending on the particle size and may be measured by using a laser diffraction method. In detail, powders to be measured are dispersed in a dispersion medium, the dispersed powders are introduced to a commercially available laser diffraction particle size measuring apparatus (for example, Microtrac S3500), and a difference of diffraction pattern depending on the particle size is measured when the particles passing through a laser beam, such that a particle size distribution is calculated. D50 may be measured by calculating a particle diameter at the point corresponding to 50% of the particle number cumulative distribution depending on the particle size by the measuring apparatus.

Meanwhile, the positive electrode active material according to an embodiment of the invention is a secondary particle formed by agglomerating a plurality of primary particles. In the preparation process of the positive electrode active material, the particle size D50 of the positive electrode active material is increased in comparison to the conventional NMC-based active material, the BET specific surface area is decreased, the excess Li in the positive electrode active material is reduced, and the pellet density of the positive electrode active material is increased by excessively calcining the precursor particle.

In detail, the positive electrode active material is the secondary particle, and a particle size D50 of the secondary particle is 10 to 16 μm, and more specifically, may be 12 to 16 μm. As described above, the secondary particle has a larger D50 in comparison to the related art, such that the excellent battery performance improvement effect may be exhibited without increase of resistance.

In addition, a particle size D10 of the secondary particle of the positive electrode active material is 8 μm or more, and more specifically, may be 8 to 10 μm. As described above, since the secondary particle has a larger D10 in comparison to the related art, storage performance of the battery at a high temperature may be enhanced due to decrease of the BET specific surface area of the positive electrode active material and reduction of the excess Li in the positive electrode active material and an energy density per volume of the battery may be increased due to increase of the pellet density of the positive electrode active material.

In addition, in the positive electrode active material, a ratio D50/D10 of the particle sizes of the secondary particles may be 1.25 to 1.55. More specifically, the ratio D50/D10 of the particle sizes of the secondary particles may be 1.25 to 1.45, and further more specifically, 1.25 to 1.4, by further controlling the particle size and structure through control in the reaction ratio of the precursor material to the lithium raw material in addition to the excessive calcination process when preparing the active material. Since the ratio of D50/D10 as described above is satisfied, the positive electrode active material has a uniform particle size in comparison to the related art, therefore the pellet density thereof is increased. As a result, the energy density per volume of the battery may be increased.

In the present invention, the particle sizes D50 and D10 of the secondary particles of the positive electrode active material may be defined as particle sizes at points corresponding to 50% and 10% of the particle number cumulative distribution depending on the particle size, respectively, and may be measured by using the laser diffraction method as described above.

In addition, under the condition in which both the ranges of the particle sizes D50 and D10 and the ratio of D50/D10 are satisfied as described above, the positive electrode active material has a low BET specific surface area, for example, 0.25 to 0.39 $m^2/g$, and more specifically, 0.28 to 0.36 $m^2/g$. Accordingly, the contact interface between the electrolyte and the positive electrode active material is reduced, such that the side reaction with the electrolyte may be minimized in a high state of charge (SOC).

Meanwhile, in the present invention, the BET specific surface area may be measured by the Brunauer-Emmett-Teller (BET) method by adsorption of nitrogen gas. Specifically, the BET specific surface area may be calculated from an adsorption amount of nitrogen gas at the temperature of liquid nitrogen (77K) using BELSORP-mino II manufactured by BEL Japan, Inc.

In addition, as lithium which may remain in the prepared active material is volatilized from the positive electrode active material through the excessive calcination process when preparing the positive electrode active material, the positive electrode active material has a significantly reduced excess lithium of 0.15 to 0.2 wt %, more specifically, 0.15 to 0.197 wt % based on the total weight of the positive electrode active material. Accordingly, the side reaction between the electrolyte and the positive electrode active material may be reduced, and particularly, the side reaction between the electrolyte and the positive electrode active material may be reduced in a high SOC.

In the present invention, the excess lithium in the positive electrode active material may be measured by using a pH titration method. Specifically, the excess lithium in the positive electrode active material may be measured by using a Metrohm pH meter. More specifically, 5±0.01 g of the positive electrode active material is put into 100 g of distilled water, stirred for 5 minutes, and filtered, thereby obtaining 50 ml of the filtered solution. Then, the solution is titrated with 0.1 N HCl until a pH of the solution drops to 4 or less and a change of a pH value is measured, thereby obtaining a pH titration curve. The excess lithium remaining in the positive electrode active material may be calculated by measuring the used amount of HCl until pH reaches 4 and using the pH titration curve.

In addition, the positive electrode active material has a high pellet density, for example, 3 to 5 g/cc, and more specifically, 3 to 4.5 g/cc. Accordingly, the energy density per volume may be increased when applied to the battery.

In the present invention, the pellet density of the positive electrode active material may be measured by applying the pressure of 2.5 tons using the Powder Resistivity Measurement System (Loresta).

In the positive electrode active material according to an embodiment of the invention, since both the ranges of the particle sizes D50 and D10 and the ratio of D50/D10 are satisfied as described above, the BET specific surface area of the positive electrode active material may be reduced and the pellet density may be increased. In addition, the positive electrode active material represents the reduced excess lithium. Accordingly, the side reaction between the electrolyte and the positive electrode active material is reduced in a high state of charge (SOC), such that an excellent battery performance, in particular, lifespan retention at a high temperature may be enhanced and the gas generation amount and the metal elution amount may be reduced during high-temperature storage of the battery. In addition, the energy density per volume may be increased when applied to the battery.

The positive electrode active material according to an embodiment of the invention may be prepared by a preparation method (Method 1) including mixing a precursor (having a particle size D50 of 8 µm or more) for preparation of a lithium composite metal oxide of Chemical Formula 1 with a lithium raw material and a raw material of an element M (M including at least one element selected from the group consisting of Al, Ti, Mg, Zr, Y, Sr, and B), and excessively calcining the mixture at a temperature of 960° C. or more; or a preparation method (Method 2) including mixing a precursor (having a particle size D50 of 8 µm or more) for preparation of a lithium composite metal oxide of Chemical Formula 1 with a lithium raw material, excessively calcining the mixture at a temperature of 960° C. or more, mixing the lithium composite metal oxide thus obtained with a raw material of an element M (M including at least one element selected from the group consisting of Al, Ti, Mg, Zr, Y, Sr, and B), and performing a heat treatment at a temperature of 200 to 800° C.

First, Method 1 is a method for preparing the positive electrode active material doped with the element M, and may be performed by mixing a precursor (having a particle size D50 of 8 µm or more) for preparation of a lithium composite metal oxide of Chemical Formula 1 with a lithium raw material and a raw material of an element M, and excessively calcining the mixture at a temperature of 960° C. or more.

In detail, in Method 1, the precursor is a precursor for preparing a lithium composite metal oxide of Chemical Formula 1, may be oxide, hydroxide or oxyhydroxide including nickel, cobalt, manganese, and the element A, and more specifically, may be hydroxide represented by Chemical Formula 3.

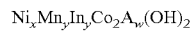 [Chemical Formula 3]

$Ni_xMn_yIn_yCo_zA_w(OH)_2$ [Chemical Formula 3]

In Chemical Formula 3, A, a, b, x, y, z, and w are the same as defined as described above.

In addition, the particle size D50 of the precursor is 8 µm or more, specifically, 8 to 12 µm, and more specifically, 8 to 10 µm. When the particle size D50 of the precursor is less than 8 µm, the secondary particle is not formed.

The particle size D50 of the precursor is a particle size at a point corresponding to 50% of a particle number cumulative distribution depending on the particle size, as described above and may be measured by using a laser diffraction method.

Nickel, cobalt, manganese, and the raw material of the element A is used as the precursor in the content defined in Chemical Formula 1, and the precursor may be prepared by a general method, except that the particle size D50 of the finally prepared precursor is 8µm or more. As an example, the precursor may be prepared by a solid phase method in which nickel oxide, cobalt oxide, manganese oxide, and optionally an oxide including the element A are mixed so that a content of the mixture is set to be the content defined in Chemical Formula 1, and a heat treatment is performed, or by a method in which a metal salt including nickel, cobalt, manganese, and the element A is added to a solvent, specifically, water or a mixture of water with an organic solvent (specifically, alcohol and the like) which can be uniformly mixed with water to perform co-precipitation reaction in the presence of an ammonium ion-containing solution and a basic aqueous solution. Control is performed to allow the mixture to be aged for a sufficient period during the co-precipitation reaction, such that the particle size D50 of the precursor may be 8µm or more.

Examples of the lithium raw material may be a lithium-containing oxide, sulfate, nitrate, acetate, carbonate, oxalate, citrate, halide, hydroxide, oxyhydroxide, or the like, and particularly may be $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$. The lithium raw material may be any one or a mixture of two or more thereof. Among these, in consideration of reaction efficiency and reduction effect of products of side reaction when the lithium raw material reacts with the precursor for preparation of a lithium composite metal oxide, the lithium raw material may be $Li_2O$ or $Li_2CO_3$.

In addition, the raw material of the element M is a material for doping the element M to the primary particle, and specifically, may be an element M-containing oxide, sulfate, nitrate, acetate, carbonate, oxalate, citrate, halide, hydroxide, oxyhydroxide, or the like. In this case, M is the same as described above. More specifically, M may be any one or a mixture of two or more selected from the group consisting of $Al_2O_3$, $TiO_2$, $MgO$, $ZrO_2$, $Y_2O_3$, $SrO$, $SiO$, $SiO_2$, $W_2O_3$, $WO_2$, $WO_3$, $B_2O_3$, $B_2O$, $B_6O$, and $H_3BO_3$.

The precursor for preparation of a lithium composite metal oxide, the lithium raw material, and the raw material of the element M as described above may be mixed and used in the content in which the content of the lithium in the finally prepared lithium composite metal oxide of Chemical Formula 1 and the range of the content of the element M included in the positive electrode active material are satisfied.

In addition, the raw material of the element M described above may be used in an amount so that the content of the element M in the finally prepared positive electrode active material is 3,800 to 7,000 ppm, and more specifically, 4,000 to 6,500 ppm. When the raw material of the element M is used in the content as described above, the growth of the primary particles of the positive electrode active material may be promoted and the structural stabilizing effect of the surface may be enhanced.

Meanwhile, in the preparation method according to an embodiment of the present invention, the particle size of the primary particle may be increased in the active positive electrode material prepared through the excessive calcination process performed at a high temperature of 960° C. or more to be described below. However, the particle size of the primary particle constituting the secondary particle may be additionally controlled by control in the mixing ratio of the lithium raw material to the precursor when mixing the lithium raw material and the precursor. In detail, the lithium raw material may be input so that a mole ratio (mole ratio of Li/Me) is 1.05 or more, specifically, 1.05 to 1.2, and more specifically, 1.06 to 1.08, the mole ratio being the lithium element in the lithium raw material to a total number of moles (Me) of the metal elements except lithium in the precursor for preparation of a lithium composite metal oxide, that is, nickel, manganese, cobalt, the element M, and optionally the element A. In this case, since the crystal grain size in the positive electrode active material and the particle size of the primary particle including the same increase and the rich content of lithium relative to the metal elements are included in the active material, the layered structure may be more perfectly formed. In addition, even though the excess lithium is input, a ratio of the lithium to the metal elements in the lithium composite metal oxide to be prepared is not changed, and lithium not participating in the formation of the lithium composite metal oxide in the input excess lithium is mostly volatilized in the excessive calcination process. A trace amount of lithium which is not volatilized may remain on the surface of the active material in a form of a compound such as lithium hydroxide, lithium carbonate, and the like. However, the amount of thereof is extremely small, thus the active material characteristics and the battery performance are not affected.

Meanwhile, the excessive calcination process may be performed at 960° C. or more, and more specifically, at 960 to 1,050° C. When the excessive calcination process is performed in the temperature range described above, the positive electrode active material having the particle size D50 of the primary particle of 1.5 to 2 μm may be prepared. As a result, since the BET specific surface area is decreased and the excess Li is reduced, the side reaction between the electrolyte and the positive electrode active material is reduced in the high SOC, therefore, the battery performance may be enhanced. In addition, the energy density per volume of the battery may be increased due to increase of the pellet density of the positive electrode active material. When the excessive calcination is performed at a temperature of less than 960° C., effects of increase of D50 of the active material to be prepared, decrease of the BET specific surface area, and reduction of the excess Li are trivial. As a result, the battery performance may be deteriorated in a high SOC due to generation of the side reaction between the electrolyte and the positive electrode active material. In consideration of an excellent improvement effect of the formation of the secondary particle according to the temperature control in the excessive calcination, the excessive calcination process may be performed at 990 to 1,050° C.

The excessive calcination process may be performed in an oxidation atmosphere containing oxygen, and more specifically, may be performed in an atmosphere in which a content of oxygen is 20 vol % or more.

In addition, the excessive calcination process may be performed for 2 hours to 24 hours, and preferably may be performed for 5 hours to 12 hours. When the calcination time satisfies the range describe above, the high crystalline positive electrode active material may be obtained and production efficiency may also be improved.

During the excessive calcination process as described above, the precursor particle is formed into a primary particle which is a polycrystalline single particle (primary particle) having a predetermined crystallite size, and then a secondary particle is formed by agglomerating the primary particles through physical or chemical bonding between the primary particles. In addition, the element M derived from the raw material of the element M is doped into an empty space in the crystal lattice structure of the compound of Chemical Formula 1 constituting the primary particles.

A cooling process may be further performed after the excessive calcination.

The cooling process may be performed according to a general method, specifically, may be performed by methods such as a natural cooling in an air atmosphere, a hot air cooling, and the like.

Meanwhile, Method 2 is a method for preparing the positive electrode active material having a surface coated with the element M, and may be performed by mixing a precursor (having a particle size D50 of 8 μm or more) for preparation of a lithium composite metal oxide of Chemical Formula 1 with a lithium raw material, and excessively calcining the mixture at a temperature of 960° C. or more, and mixing the lithium composite metal oxide obtained with a raw material of an element M, and performing a heat treatment at a temperature of 200 to 800° C.

Specifically, in Method 2, types and uses of the precursor and the lithium raw material may be the same as in Method 1, and the excessive calcination process may be performed in the same manner as described in Method 1.

In addition, when mixing the precursor and the lithium raw material, the raw material of the element M may be further selectively added. In this case, similar to Method 1, the lithium composite metal oxide doped with the element M may be prepared.

After the excessive calcination process, the lithium composite metal oxide thus obtained is mixed with the raw material of the element M, and a heat treatment is performed at 200 to 800° C., more specifically, at 280° C. to 720° C., thereby forming a coated layer including the element M. When the heat treatment temperature satisfies the range described above, the coated layer is distributed on the particle surface at an appropriate thickness. Therefore, passivation on the positive electrode surface may be performed well.

In addition, the heat treatment process may be performed for 2 hours to 24 hours, and more specifically, may be performed for 4 hours to 10 hours. When the heat treatment time satisfies the range describe above, the positive electrode active material having a uniformly coated layer may be obtained, and production efficiency may also be improved.

The raw material of the element M described above may be used in an amount so that the content of the element M based on the total weight of the finally prepared positive electrode active material is 3,800 to 7,000 ppm, and more specifically, 4,000 to 6,500 ppm. In a case where the lithium composite metal oxide prepared by the excessive calcination is doped with the element M, the raw material of the element M may be used so that the total amount of the doping amount and the coating amount is an amount excluding the doping amount from the content of the element M in the finally prepared positive electrode active material.

In a case where the coated layer including the element M is formed on the surface of the positive electrode active material, the surface of the positive electrode material is stably maintained in a high voltage and high temperature environment, such that the side reaction with the electrolyte is prevented, as a result, high voltage and high temperature performance may be improved.

As described above, in the preparation method according to the present invention, the excessive calcination is performed at the temperature of 960° C. or more by using the precursor having the particle size of 8 µm or more, thereby preparing the positive electrode active material. The positive electrode active material has a secondary particle phase formed by agglomerating a plurality of primary particles. The particle size of the primary particle and the size of the crystal grain constituting the primary particle are increased in comparison to the conventional active material having a particle size of a secondary particle of 12 µm, and the BET specific surface area of the positive electrode active material is decreased. Accordingly, the interfacial area with the electrolyte is decreased and the excess lithium in the active material is reduced due to the excessive calcination, therefore, the side reaction with the electrolyte may be reduced. In addition, in spite of the volume change during charging and discharging, the excellent durability may be exhibited by maintaining contact between the primary particles with each other, and the increased energy density per volume may be exhibited due to increase of the pellet density when applied to the battery. As a result, the positive electrode active material may exhibit the excellent battery performance and lifespan characteristics when the battery is driven at a high voltage of 4.35 V or more, in particular, lifespan characteristics at a high temperature due to excellent structure stability.

According to yet another exemplary embodiment of the present invention, a positive electrode for a lithium secondary battery including the positive electrode active material and a lithium secondary battery are provided.

In the positive electrode and the lithium secondary battery prepared using the positive electrode active material, the side reaction between the electrolyte and the positive electrode active material is reduced in a high SOC and the energy density per volume is increased, such that excellent battery performance may be exhibited.

Specifically, the positive electrode includes a positive electrode current collector and a positive electrode active material layer formed on the positive electrode current collector and including the positive electrode active material described above.

The positive electrode current collector may be not particularly limited as long as it has conductivity without causing chemical changes in a battery. Examples of the positive electrode current collector may include stainless steel, aluminum, nickel, titanium, baked carbon, or aluminum or stainless steel of which a surface is treated with carbon, nickel, titanium, silver, or the like. In addition, the positive electrode current collector may have a thickness of 3 µm to 500 µm. The positive electrode current collector may increase adhesiveness between the positive electrode active materials by forming a fine roughness on the surface of the positive electrode current collector. As an example, various forms such as a film, a sheet, a foil, a net, a porous body, a foam body, a non-woven fabric body, and the like may be used.

In addition, the positive electrode active material layer may include a conductive material and a binder together with the positive electrode active material described above.

In this case, the conductive material may be used for providing conductivity to the electrode. The conductive material may be not particularly limited as long as it has electron conductivity without causing chemical changes in a battery. Specific examples of the conductive material may include carbon-based materials such as carbon black, acetylene black, Ketjen black, channel black, furnace black, lamp black, thermal black or carbon fiber; graphite such as natural graphite or artificial graphite; metal powder or metal fiber such as copper, nickel, aluminum or silver; conductive whiskers such as a zinc oxide whisker, or a potassium titanate whisker; conductive metal oxides such as titanium oxide; or conductive polymers such as polyphenylene derivatives, and the like, and one or a mixture of two or more thereof may be used. The conductive material may be included at 1 wt % to 30 wt % based on a total weight of the positive electrode active material layer.

In addition, the binder serves to bond positive electrode active material particles to each other and enhance adhesiveness between the positive electrode active material and the current collector. Specific examples of the binder may include polyvinylidene fluoride (PVDF), polyvinylidene-fluoride-co-hexafluoropropylene (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene monomer (EPDM), sulfonated-EPDM, styrene-butadiene rubber (SBR), or fluoro rubber, or various copolymers thereof, and one or a mixture of two or more thereof may be used. The binder may be included at 1 wt % to 30 wt % based on a total weight of the positive electrode active material layer.

Except for use of the positive electrode active material described above, the positive electrode may be prepared according to a general method for preparing a positive electrode. Specifically, the positive electrode may be prepared by applying a composition for forming the positive electrode active material layer that includes the active material and selectively includes the binder and the conductive material on the positive electrode current collector and then drying and rolling. Here, the types and contents of the positive electrode active material, the binder, and the conductive material are the same as those described above.

A solvent may be a solvent that is generally used in the art, examples of the solvent may include dimethyl sulfoxide (DMSO), isopropyl alcohol, N-methyl pyrrolidone (NMP), acetone, or water, and one or a mixture of two or more selected thereof may be used as the solvent. A use amount of solvent is sufficient as long as the solvent has a viscosity capable of allowing the positive electrode active material, the conductive material, and the binder to be dissolved or dispersed and exhibiting excellent thickness uniformity when applied for preparing a positive electrode in consideration of a thickness of an applied slurry and a preparation yield.

As another method, the positive electrode may be prepared by casting the composition for forming the positive electrode active material layer on a separate support body and then laminating a film obtained by separation from the support body on the positive electrode current collector.

According to yet another embodiment of the present invention, an electrochemical device including the positive electrode is provided. Specifically, the electrochemical device may be a battery, a capacitor, and the like, and more specifically, may be a lithium secondary battery.

Specifically, the lithium secondary battery includes a positive electrode, an negative electrode disposed opposite the positive electrode, a separator interposed between the positive electrode and the negative electrode, and an electrolyte, and the positive electrode is the same as that described above. In addition, the lithium secondary battery may selectively further include a battery container which stores an electrode assembly including the positive electrode, the negative electrode, and the separator, and a sealing member which seals the battery container.

In the lithium secondary battery, the negative electrode includes an negative electrode current collector and an negative electrode active material layer disposed on the negative electrode current collector.

The negative electrode current collector may be not particularly limited as long as it has high conductivity without causing chemical changes in a battery. Examples of the negative electrode current collector may include copper, stainless steel, aluminum, nickel, titanium, baked carbon, or copper or stainless steel of which a surface is treated with carbon, nickel, titanium, silver, or the like, aluminum-cadmium alloys, and the like. In addition, the negative electrode current collector may normally have a thickness of 3 µm to 500 µm. The negative electrode current collector may increase adhesiveness between the negative electrode active materials by forming a fine roughness on the surface of the negative electrode current collector, similar to the positive electrode current collector. As an example, various forms such as a film, a sheet, a foil, a net, a porous body, a foam body, a non-woven fabric body, and the like may be used.

The negative electrode active material layer described above may selectively include a binder and a conductive material together with the negative electrode active material. As an example, the negative electrode active material layer may be prepared by applying a composition for forming an negative electrode that includes the negative electrode active material and selectively includes the binder and the conductive material on the negative electrode current collector and then drying, or by casting the composition for forming the negative electrode on a separate support body and then laminating a film obtained by separation from the support body on the negative electrode current collector.

The negative electrode active material may use a compound capable of reversible intercalation and deintercalation of lithium. Specific examples of the negative electrode active material may include carbon materials such as artificial graphite, natural graphite, graphitized carbon fiber and amorphous carbon; metal compounds capable of alloying with lithium such as Si, Al, Sn, Pb, Zn, Bi, In, Mg, Ga, Cd, Si alloys, Sn alloys or Al alloys; metal oxides capable of doping and dedoping lithium such as $SiO_x$ (0<x<2), $SnO_2$, vanadium oxides and lithium vanadium oxides; or complexes including the metal compound and the carbon compound such as Si—C complexes or Sn—C complexes, and any one or a mixture of two or more thereof may be used. In addition, a metal lithium thin film may be used as the negative electrode active material. Further, a carbon material may use both low crystalline carbon and high crystalline carbon. The low crystalline carbon typically includes soft carbon and hard carbon, and the high crystalline carbon typically includes amorphous, platy, scaly, spherical or fiber-shaped natural graphite or artificial graphite, and high-temperature baked carbon such as Kish graphite, pyrolytic carbon, mesophase pitch based carbon fiber, meso-carbon microbeads, mesophase pitches, and petroleum or coal tar pitch derived cokes.

In addition, the binder and the conductive material may be the same as those described above with respect to the positive electrode.

Meanwhile, in the lithium secondary battery, the separator separates an negative electrode and a positive electrode, and provides an ion channel for lithium ions, and is not particularly limited as long as it is commonly used as a separator in a general lithium secondary battery. Particularly, a separator having low resistance against ion migration of an electrolyte and having excellent electrolyte moisture containing ability is preferable. Specifically, the separator may be made of a porous polymer film, for example, a porous polymer film prepared from a polyolefin-based polymer such as an ethylene homopolymer, a propylene homopolymer, an ethylene-butene copolymer, an ethylene-hexene copolymer or an ethylene-methacrylate copolymer or a laminate structure having two or more layers. Alternatively, the separator may be made of a porous nonwoven fabric, for example, a nonwoven fabric made of high-melting point glass fiber, polyethylene terephthalate fiber, and the like. In addition, in order to ensure heat resistance or mechanical strength, the separator may be a coated separator including ceramic components or polymer materials, and selectively, may be used in a single-layer or multi-layer structure.

In addition, the electrolyte used in the present invention may be an organic liquid electrolyte, an inorganic liquid electrolyte, a solid polymer electrolyte, a gel polymer electrolyte, an inorganic solid electrolyte, a molten-type inorganic electrolyte or the like, which may be used in the manufacture of a lithium secondary battery, but the present invention is not limited thereto.

Specifically, the electrolyte may include an organic solvent and a lithium salt.

The organic solvent is not particularly limited as long as it may act as a medium capable of migrating ions involved in an electrochemical reaction of a battery. Specifically, the organic solvent may be an ester-based solvent such as methyl acetate, ethyl acetate, γ-butyrolactone, ε-caprolactone or the like; an ether-based solvent such as dibutyl ether, tetrahydrofuran or the like; a ketone-based solvent such as cyclohexanone or the like; an aromatic hydrocarbon-based solvent such as benzene, fluorobenzene or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) or the like; an alcohol-based solvent such as ethyl alcohol, isopropyl alcohol or the like; nitriles such as R-CN (R is a linear, branched or cyclic hydrocarbon group of C2 to C20 and may include a double-bond aromatic ring and an ether bond) or the like; amides such as dimethylformamide or the like; dioxolanes such as 1,3-dioxolane or the like; or sulfolanes. Among these compounds, the carbonate-based solvent is preferable, and a mixture of a cyclic carbonate having high ionic conductivity and a high dielectric constant, which are capable of enhancing the charging and discharging performance of a battery (for example, ethylene carbonate, propylene carbonate, or the like) and a linear carbonate-based compound with low viscosity (for example, ethyl methyl carbonate, dimethyl carbonate, diethyl carbonate, or the like) is more preferable. In this case, when the cyclic carbonate and the chain carbonate are mixed at a volume ratio of about 1:1 to 9 for use, excellent performance of the electrolyte may be exhibited.

The lithium salt is not particularly limited as long as it is a compound which can provide lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like. The concentration of the lithium salt is preferably within a range of 0.1 M to 2.0 M. When the concentration of the lithium salt is within the above range, an electrolyte has appropriate conductivity and viscosity, and thus excellent performance of the electrolyte may be exhibited and lithium ions may be effectively migrated.

In addition to the electrolyte components, for the purpose of improving lifespan characteristics of the battery, suppressing a decrease in battery capacity, improving discharge capacity of the battery and the like, the electrolyte may further include one or more additives such as a haloalkylene carbonate-based compound such as difluoroethylene carbonate or the like, pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum trichloride and the like. In this case, the additives may be included at 0.1 wt % to 5 wt % based on a total weight of the electrolyte.

The secondary battery including the positive electrode active material according to the present invention stably exhibit excellent discharge capacity, output property, and capacity retention, and therefore may be useful in portable devices such as a mobile phone, a laptop computer, a digital camera, and the like and the electric vehicles such as a hybrid electric vehicle (HEV), and the like.

Accordingly, according to another embodiment of the present invention, a battery module including the lithium secondary battery as a unit cell and a battery pack including the same are provided.

The battery module or the battery pack may be used as a power source of a medium-large size device of at least one of a power tool; an electric vehicle including an electric vehicle (EV), a hybrid electric vehicle and a plug-in hybrid electric vehicle (PHEV); or a system for storing electric power.

Hereinafter, examples of the present invention will be described in detail in such a manner that it may easily be implemented by those skilled in the art to which the present invention pertains. However, the present invention may be implemented in various different forms and is not limited to exemplary embodiment described herein.

In addition, methods used in the following Experimental Examples when measuring physical properties of a positive electrode active material or a precursor are as follow.

1) Particle sizes D50 and D10 (μm): According to a laser diffraction method using a laser diffraction particle size measuring apparatus (Microtrac MT 3000), the particle sizes (D50 and D10) of the precursor, and the primary particle and the secondary particle of the active material were measured at points corresponding to 50% and 10% of a particle number cumulative distribution depending on the particle size, respectively.

2) Specific surface area (BET, $m^2/g$): According to a Brunauer-Emmett-Teller (BET) method by adsorption of nitrogen gas, a specific surface area was calculated from an adsorption amount of nitrogen gas at a temperature of liquid nitrogen (77K) using BELSORP-mino II manufactured by BEL Japan, Inc.

3) Excess Li (wt %): The excess lithium in the positive electrode active material was measured by a pH titration method with a Metrohm pH meter. More specifically, 5±0.01 g of the positive electrode active material was put into 100 g of distilled water, stirred for 5 minutes, and filtered, thereby obtaining 50 ml of the filtered solution. Then, the solution was titrated with 0.1 N HCl until a pH of the solution drops to 4 or less and a change of a pH value was measured, thereby obtaining the pH titration curve. The excess lithium remaining in the positive electrode active material was calculated by measuring the used amount of HCl until a pH reaches 4 and using the pH titration curve.

4) Average crystallite size (nm): The crystal grain size of the primary particle was measured with an X-ray diffractometer (Bruker AXS D-4-Endeavor XRD), and an average value is obtained.

The X-ray diffraction (XRD) was measured by Cu-Kα X-ray, in this case, an apply voltage and an apply current were set as 40 kV and 40 mA, respectively. A measurement range of 2θ was 10° to 90°, and the XRD measurement was performed by scanning at an interval of 0.05°. In this case, a variable divergence slit (6 mm) was used, and in order to reduce a background noise due to a polymethyl methacrylate (PMMA) holder, a large PMMA holder (diameter=20 mm) was used. An intensity ratio was calculated by using an EVA program (Bruker Corporation).

5) Pellet density (g/cc): The measurement was performed by applying the pressure of 2.5 tons using the Powder Resistivity Measurement System (Loresta).

6) Content of Element M: The content of the element M included in the positive electrode active material by being coated or doped was measured by using the inductively coupled plasma spectrometer (ICP).

7) Evaluation of charging and discharging characteristic in 4.40 V coin half cell The positive electrode active material prepared in Examples or Comparative Examples below, a carbon black conductive material, and a PVdF binder were mixed in an N-methylpyrrolidone solvent at a weight ratio of 96:2:2 to prepare a composition for forming a positive electrode (viscosity: 5,000 mPa·s), an aluminum current collector having a thickness of 20 μm was coated with the composition, and then the coated current collector was dried at 130° C. to prepare a positive electrode. Li-metal was used as an negative electrode, a solution of 1 M $LiPF_6$ in an organic solvent containing ethylene carbonate/dimethylcarbonate/diethylcarbonate (mixing volume ratio of EC:DMC:DEC=1:2:1) was used as an electrolyte to prepare a coin half cell.

Charge capacity and discharge capacity of the coin half cell prepared above were measured by performing an initial cycle under the following conditions: voltage of 3.0 to 4.40 V and current of 0.2 C-rate. A value calculated from (discharge capacity/charge capacity)×100 was determined as charging and discharging efficiency at $1^{st}$ cycle.

8) Evaluation of high temperature lifespan characteristic in 4.35 V full cell

The positive electrode active material prepared in Examples or Comparative Examples below, a carbon black conductive material, and a PVdF binder were mixed in an N-methylpyrrolidone solvent at a weight ratio of 96:2:2 to prepare a composition for forming a positive electrode (viscosity: 5,000 mPa·s), an aluminum current collector having a thickness of 20 μm was coated with the composition, and then the coated current collector was dried at 130° C. and roll-pressed to prepare a positive electrode.

In addition, a composition for forming an negative electrode was prepared by mixing mesocarbon microbead (MCMB) which is artificial graphite as an negative electrode active material, a carbon black conductive material, and a PVdF binder in a weight ratio of 96:2:2 in an N-methylpyrrolidone solvent, and the composition was applied on a copper current collector and dried to prepare an negative electrode.

An electrode assembly was prepared by placing a porous polyethylene separator between the positive electrode and the negative electrode prepared as described above, the electrode assembly was placed inside a case, and then an electrolyte was injected into the case to manufacture a lithium secondary battery (full cell). In this case, the electrolyte includes 1.15 M $LiPF_6$ with the organic solvent containing ethylene carbonate/dimethylcarbonate/ethylmethylcarbonate (mixing volume ratio of EC:DMC:EMC=3:4:3).

High temperature capacity retention (%): The lithium secondary battery prepared as described above was charged up to 4.35 V/38 mA with 0.7 C under a constant current/constant voltage (CC/CV) condition at 45° C., and then discharged down to 3.0 V with 0.5 C under a constant current (CC), and the discharge capacity was measured. In addition, the charge and discharge defined as one cycle was repeated for 100 cycles. A value calculated from (capacity after $100^{th}$ cycle/capacity after $1^{st}$ cycle)×100 was represented as high temperature capacity retention (%). High temperature lifespan characteristics were evaluated from the results.

9) Gas generation amount (μL): The 4.40 V coin half cell prepared in 7) was charged up to 4.40 V with 0.2 C, the coin cell was disassembled, the charged positive electrode was collected to wash with dimethylcarbonate (DMC). Subsequently, the charged positive electrode was put into a pouch and then sealing was performed at 93 kPa in a state of the charged positive electrode being wetted with 80 μL of an electrolyte which is a solution of 1 M $LiPF_6$ in a solvent containing ethylene carbonate/dimethylcarbonate/diethylcarbonate (mixing volume ratio of EC:DMC:DEC=1:2:1). The electrolyte-impregnated charged positive electrode which is sealed in the pouch was stored for two weeks at a temperature of 60° C., and then the gas generation amount of the battery was measured by using a gas chromatography (GC).

10) Metal elution amount (ppm): The electrolyte-impregnated charged positive electrode which is sealed in the pouch prepared in 9) was stored for two weeks at a temperature of 60° C., and then the content of eluted metal was analyzed by the ICP (PerkinElmer, Inc. model name: 7100).

PREPARATION EXAMPLE $NiSO_4$, $CoSO_4$, and $MnSO_4$ were mixed in $H_2O$ in an amount so that a mole ratio of nickel:cobalt:manganese is 50:30:20 to prepare a transition metal-containing solution. The transition metal-containing solution was continuously put into a co-precipitation reactor at a rate of 180 mL/min, a NaOH aqueous solution and a $NH_4OH$ aqueous solution were put into the reactor at 180 mL/min and 10 mL/min, respectively, to perform co-precipitation reaction for 12 hours, thereby precipitating and spherizing particles of nickel manganese cobalt composite metal oxides. The particles of the precipitated nickel manganese cobalt composite metal oxides were separated and washed, and then the particles were dried in an oven at 120° C. for 12 hours to prepare a precursor ($Ni_{0.5}Co_{0.3}Mn_{0.2}(OH)_2$) having D50 of 12 μm.

Example 1

The positive electrode active material ($LiNi_{0.5}Co_{0.3}Mn_{0.2}O_2$) doped with Zr in an amount of 5,500 ppm based on the total weight of the positive electrode active material was prepared by dry-mixing 113.9 g of the precursor ($Ni_{0.5}Co_{0.3}Mn_{0.2}(OH)_2$) having a particle size D50 of 12 μm, 48.47 g of $Li_2CO_3$ as a lithium raw material, and 0.839 g of $ZrO_2$ as a raw material of the element M, and excessively calcining the mixture.

Example 2

The positive electrode active material doped with Zr/Mg/Ti was prepared in the same manner as in Example 1, except that the precursor ($Ni_{0.5}Co_{0.3}Mn_{0.2}(OH)_2$) having a particle size D50 of 11 μm, which is prepared through the condition change when preparing the precursor, was used, the excessive calcination was performed at 990° C., and the doping treatment was performed with Zr/Mg/Ti.

Example 3

The positive electrode active material coated with Al in an amount of 1,000 ppm based on a total weight of the positive electrode active material was prepared by dry-mixing the positive electrode active material ($LiNi_{0.5}Co_{0.3}Mn_{0.2}O_2$) doped with Zr prepared in Example 1 with 0.095 g of $Al_2O_3$, and then performing a heat treatment at 500° C.

Example 4

The positive electrode active material ($LiNi_{0.5}Co_{0.3}Mn_{0.2}O_2$) doped with Zr in an amount of 5,500 ppm based on a total weight of the positive electrode active material was prepared in the same manner as in Example 1, except that a lithium raw material was added so that a mole ratio (mole ratio of Li/Me) of lithium (Li) included in the lithium raw material ($Li_2CO_3$) to a total number of moles of metal elements (Me) including nickel, cobalt, and manganese in the precursor ($Ni_{0.5}Co_{0.3}Mn_{0.2}(OH)_2$) is 1.02.

Comparative Example 1

The positive electrode active material doped with Zr/Mg/Ti was prepared in the same manner as in Example 1, except that the precursor ($Ni_{0.5}Co_{0.3}Mn_{0.2}(OH)_2$) having a particle size D50 of 5 μm, which is prepared through the condition change when preparing the precursor, was used, the calcination was performed at 920° C., and the doping treatment was performed with Zr/Mg/Ti.

In detail, the positive electrode active material doped with Zr/Mg/Ti was prepared by dry-mixing 113.9 g of a precursor ($Ni_{0.5}Co_{0.3}Mn_{0.2}(OH)_2$) having a particle size D50 of 5 μm with 47.1 g of $Li_2CO_3$ as a lithium raw material, and 0.534 g of $ZrO_2$, 0.012 g of MgO, and 0.049 g of $TiO_2$ as a raw material of the element M, and calcining the mixture at 920° C.

Comparative Example 2

The non-doped positive electrode active material was prepared in the same manner as in Example 1, except that the precursor ($Ni_{0.5}Co_{0.3}Mn_{0.2}(OH)_2$) having a particle size D50 of 12 µm prepared in Preparation Example was used, the excessive calcination was performed at 990° C., and the doping treatment with Zr was not performed.

Comparative Example 3

The positive electrode active material doped with Zr in an amount of 1,500 ppm was prepared in the same manner as in Example 1, except that the precursor ($Ni_{0.5}Co_{0.3}Mn_{0.2}(OH)_2$) having a particle size D50 of 12 µm prepared in Preparation Example was used, the excessive calcination was performed at 990° C., and the doping treatment with Zr was performed in the amount of 1,500 ppm.

Comparative Example 4

The positive electrode active material doped with Zr in an amount of 3,500 ppm was prepared in the same manner as in Example 1, except that the precursor ($Ni_{0.5}Co_{0.3}Mn_{0.2}(OH)_2$) having a particle size D50 of 12 µm prepared in Preparation Example was used, the excessive calcination was performed at 990° C., and the doping treatment with Zr was performed in the amount of 3,500 ppm.

Comparative Example 5

The positive electrode active material doped with Zr in an amount of 7,500 ppm was prepared in the same manner as in Example 1, except that the precursor ($Ni_{0.5}Co_{0.3}Mn_{0.2}(OH)_2$) having a particle size D50 of 12 µm prepared in Preparation Example was used, the excessive calcination was performed at 990° C., and the doping treatment with Zr was performed in the amount of 7,500 ppm.

Comparative Example 6

The positive electrode active material ($LiNi_{0.5}Co_{0.3}Mn_{0.2}O_2$) doped with Zr in an amount of 5,500 ppm based on a total weight of the positive electrode active material was prepared in the same manner as in Example 1, except that a lithium raw material was added so that a mole ratio (mole ratio of Li/Me) of lithium (Li) included in the lithium raw material ($Li_2CO_3$) to a total number of moles of metal elements (Me) including nickel, cobalt, and manganese in the precursor ($Ni_{0.5}Co_{0.3}Mn_{0.2}(OH)_2$) having a particle size D50 of 12 µm is 1.02, and excessive calcination was performed at 920° C.

Comparative Example 7

The positive electrode active material doped with Zr/Mg/Ti was prepared in the same manner as in Example 2, except that the excessive calcination temperature was changed to 920° C.

Comparative Example 8

The precursor ($Ni_{0.35}Co_{0.05}Mn_{0.6}(OH)_2$) was prepared in the same manner as in Preparation Example, except that a use amount of raw material of each the metal was changed so that the mole ratio of Ni:Co:Mn is 0.35:0.05:0.6 in the finally prepared precursor.

The positive electrode active material including Mn-rich lithium composite metal oxide and doped with Zr/Mg/Ti was prepared in the same manner as in Example 2, except that the precursor was used and the excessive calcination temperature was changed to 1,030° C.

Comparative Example 9

The precursor ($Ni_{0.5}Co_{0.5}(OH)_2$) was prepared in the same manner as in Preparation Example, except that an use amount of raw material of each metal was changed so that the mole ratio of Ni:Co is 0.5:0.5 in the finally prepared precursor without using the raw material of Mn.

The positive electrode active material doped with Zr/Mg/Ti was prepared in the same manner as in Example 2, except that the precursor was used and the excessive calcination temperature was changed to 850° C.

Reference Example 1

The positive electrode active material doped with Zr/Mg/Ti was prepared in the same manner as in Example 1, except that the precursor of 5 µm was used, the excessive calcination was performed at 990° C., and the doping treatment was performed with Zr/Mg/Ti.

Reference Example 2

The positive electrode active material doped with Zr/Mg/Ti was prepared in the same manner as in Example 1, except that the precursor of 7 µm was used, the excessive calcination was performed at 990° C., and the doping treatment was performed with Zr/Mg/Ti.

Experimental Example 1: Excessive Calcination Effect

Figure 2:
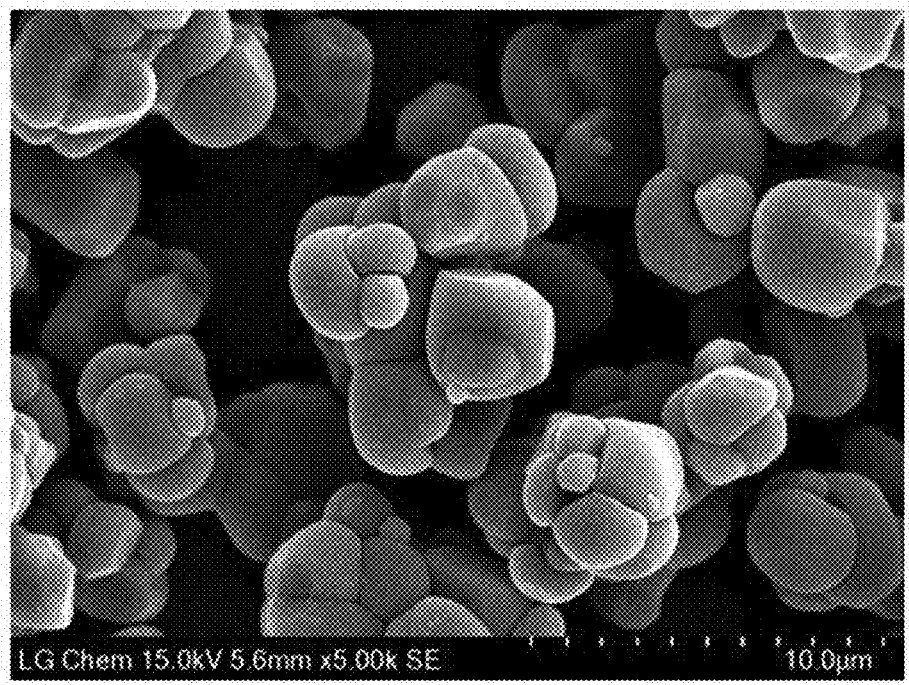

The active materials prepared in Comparative Example 1 and Reference Example 1 were observed and analyzed with a scanning electron microscope (SEM) and excessive calcination effect was evaluated from the results. The results are shown in Table 1 and FIGS. 1 and 2.

TABLE 1

|  | Comparative Example 1 | Reference Example 1 | Difference (Δ) |
|---|---|---|---|
| Particle size D50 of secondary particle (µm) | 4.6 | 6.8 | ▲48% |
| BET specific surface area of secondary particle ($m^2/g$) | 0.57 | 0.38 | ▼33% |
| Excess Li (%) | 0.17 | 0.11 | ▼35% |
| Average crystallite size (nm) | 146 | 233 | ▲60% |
| Pellet density (g/cc) | 2.75 | 2.98 | ▲8% |

As a result, in the same precursor, when increasing the calcination temperature, the particle size D50 was increased, the BET specific surface area was decreased, the excess Li was reduced, and the average crystallite size and the pellet density were increased.

In general, increase of D50, decrease of a BET specific surface area, and reduction of an excess Li are effective in decreasing side reaction between an electrolyte and a positive electrode active material in a high SOC, resulting in enhancement of battery performance. Increase of a pellet density is effective in improving an energy density per volume of the battery. Therefore, it is appreciated that battery performance and an energy density per volume of the battery may be improved by excessively calcining an active material.

Experimental Example 2: Precursor Particle Size Effect

Figure 3:
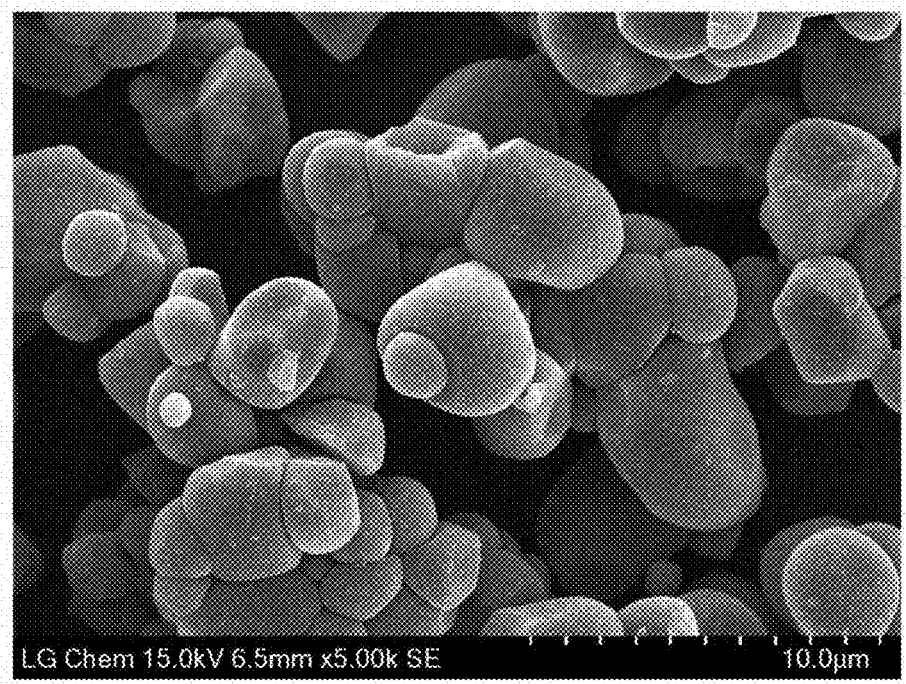
FIGS. 3 to 5 are photographs obtained with the SEM of the precursors prepared in Reference Example 1, Reference Example 2, and Example 2.
Figure 4:
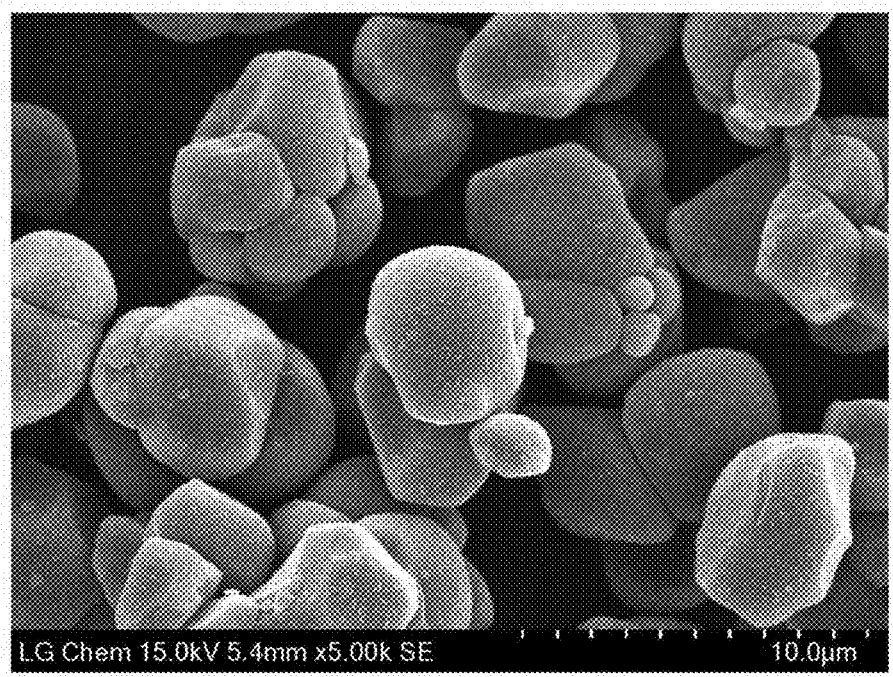
Figure 5:
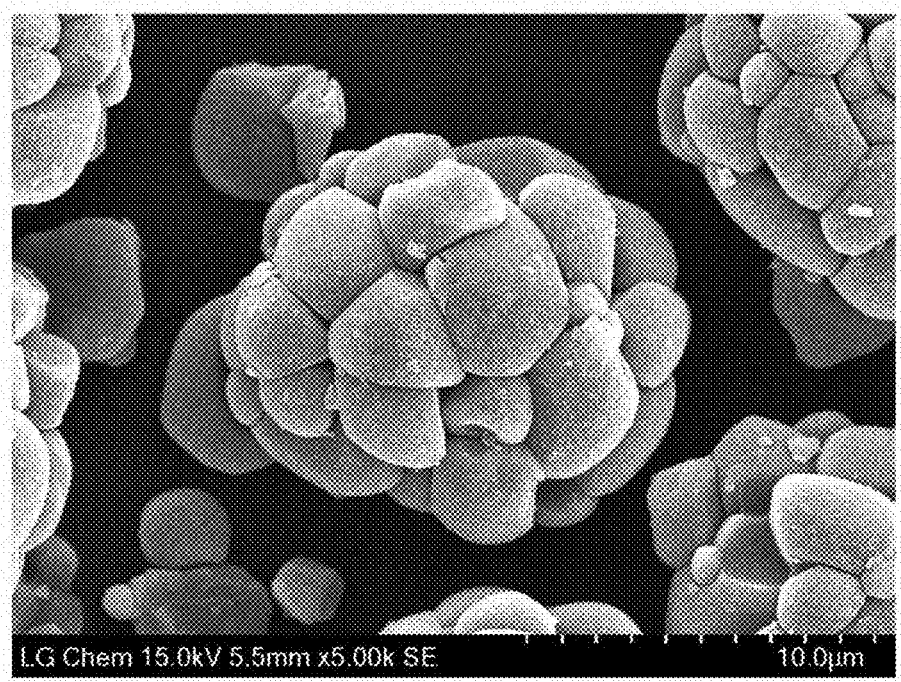
Figure 6:
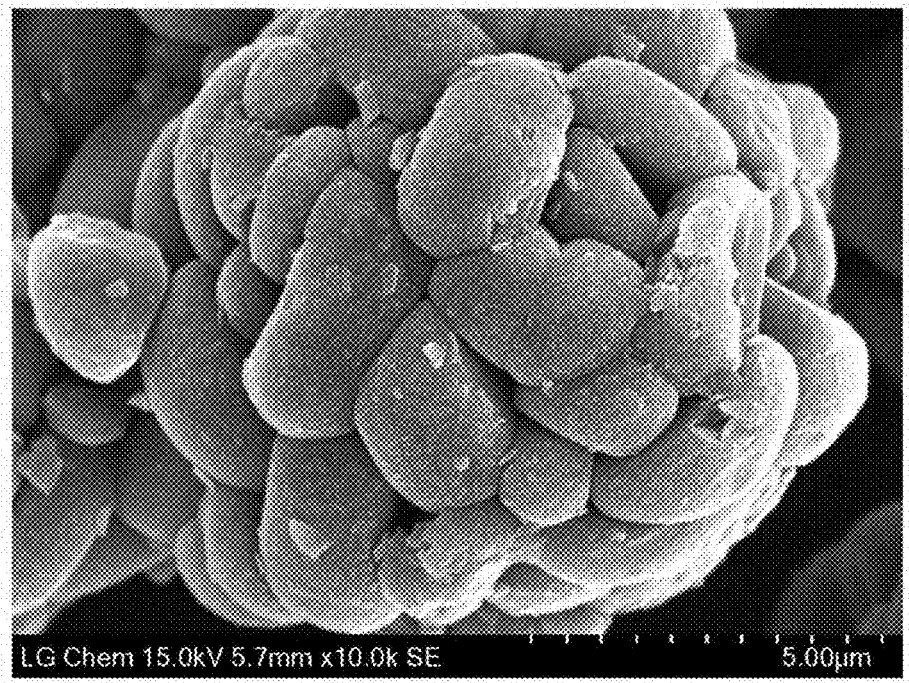
FIGS. 6 to 9 are photographs obtained with the SEM of the positive electrode active materials prepared in Comparative Examples 2 to 4 and Examples 1.
Figure 7:
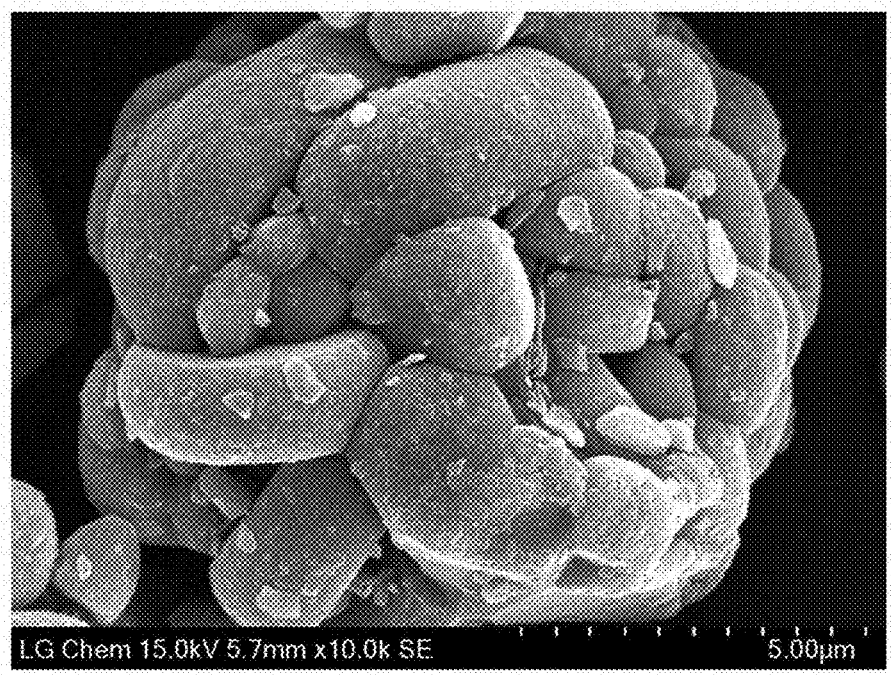
Figure 8:
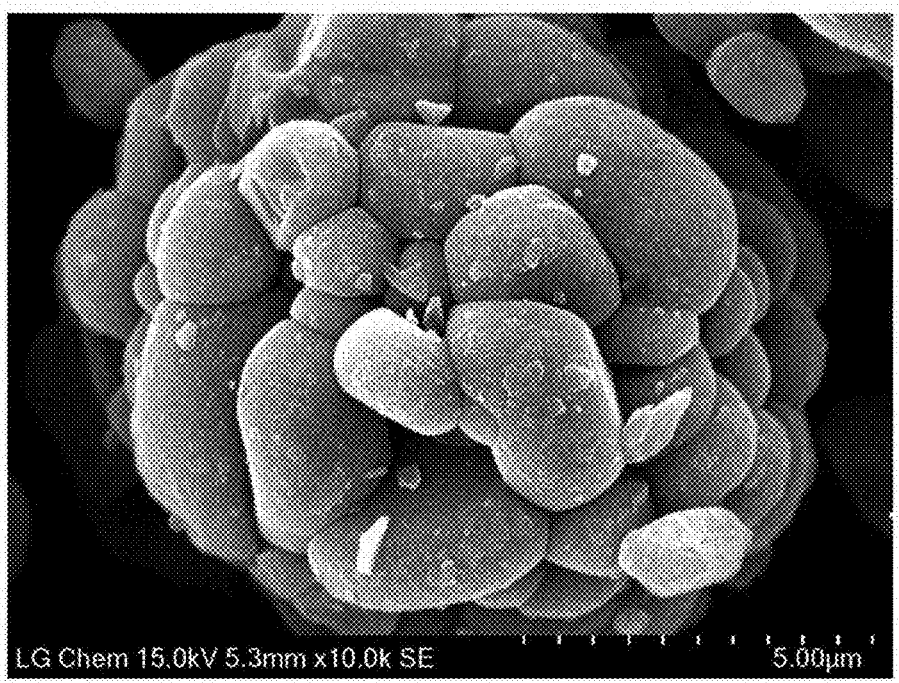

The active materials prepared in Reference Examples 1 and 2 and Example 2 were observed and analyzed with a scanning electron microscope (SEM), and effect of a precursor particle size on formation of the secondary particle was evaluated from the results. The results are shown in Table 2 and FIGS. 3 and 5.

TABLE 2

|  | Unit | Reference Example 1 | Reference Example 2 | Example 2 |
|---|---|---|---|---|
| Particle size D50 of precursor | μm | 5 | 7 | 11 |
| Particle size D50 of secondary particle | μm | 6.8 | 9.2 | 11.7 |
| Pellet density (2.5 ton) | g/cc | 2.98 | 3.11 | 3.18 |
| Average crystallite size | nm | 233 | 224 | 218 |
| Whether or not secondary | | Each single particle is | Each single particle is | Single particles are |
| particle of active material is formed | | present in a grain unit | present in a grain unit | agglomerated in a form of secondary particle |

As a result, even in a case where the precursors were excessively calcined at the same temperature, a particle size and a particle shape of the finally prepared active material were changed depending on the particle size of the precursor. In detail, when preparing an NCM-based active material by performing excessively calcining at 990° C., formation of the secondary particle is generated at a point at which the particle size D50 of the precursor exceeds 7 μm (refer to Example 2). As such, when the excessively calcnied primary particle is formed into a secondary particle, an interfacial area between an electrolyte and a positive electrode active material is minimized. As a result, side reaction therebetween is reduced, such that battery performance may be enhanced. Further, the pellet density was improved by about 10%, such that the energy density per volume of the battery was increased.

Experimental Example 3: Doping Amount Effect

The positive electrode active materials prepared in Example 1 and Comparative Examples 2 to 4 were observed and analyzed with a scanning electron microscope (SEM), further, a composition for forming a positive electrode was prepared by using the positive electrode active material and a lithium secondary battery was manufactured by using the positive electrode active material, and then battery performance was evaluated. The results are shown in Table 3 and FIGS. 6 to 9.

TABLE 3

| | | Unit | Comparative Example 2 | Comparative Example 3 | Comparative Example 4 | Example 1 |
|---|---|---|---|---|---|---|
| Physical property of active material particle | Doping amount | ppm | Bare | 1500 | 3500 | 5500 |
| | Particle size D50 of primary particle | μm | 2.7 | 2.5 | 2.6 | 2.4 |
| | Particle size D10 of secondary particle | μm | 8.9 | 8.8 | 9.2 | 9.1 |
| | Particle size D50 of secondary particle | μm | 12.8 | 12.5 | 12.8 | 12.2 |
| | Ratio of D50/D10 | | 1.44 | 1.42 | 1.39 | 1.34 |
| | Pellet density (2.5 ton) | g/cc | 3.25 | 3.26 | 3.24 | 3.19 |
| | Average crystallite size | nm | 213 | 199 | 207 | 193 |
| Evaluation of charging and discharging | 1$^{st}$ 0.2 C charge capacity | mAh/g | 194.8 | 195.4 | 197.0 | 194.7 |

TABLE 3-continued

|  |  | Unit | Comparative Example 2 | Comparative Example 3 | Comparative Example 4 | Example 1 |
|---|---|---|---|---|---|---|
| characteristic in 4.40 V coin half cell | 1st 0.2 C discharge capacity | mAh/g | 173.6 | 172.4 | 173.0 | 174.2 |
|  | Charging and discharging efficiency at 1st cycle | % | 89.1 | 88.2 | 87.9 | 89.5 |
| Evaluation of high temperature characteristic in 4.35 V full cell | High temperature retention | % | 84.2 | 82.0 | 88.7 | 90.5 |

When doping Zr, more excellent high-voltage characteristics were exhibited due to stability of a surface structure. When the doping content of Zr exceeds 3,500 ppm, and more specifically 3,800 ppm or more, improved effect was further exhibited from the viewpoint of high temperature lifespan characteristics.

Experimental Example 4: Ratio of Li/Me and Excessive Calcination Effect

The active materials prepared in Comparative Example 6 and Examples 1 and 4 were observed and analyzed with a scanning electron microscope (SEM), and when mixing the lithium raw material and the precursor, control in a metal ratio of Li/Me and excessive calcination effect were evaluated from the results. The results are shown in Table 4 and FIG. 10.

TABLE 4

|  |  | Unit | Comparative Example 6 | Example 1 | Example 4 |
|---|---|---|---|---|---|
| Heat treatment temperature at the time of excessive calcination |  | ° C. | 920 | 990 | 990 |
| Mole ratio (mole ratio of Li/Me) of lithium (Li) in lithium raw material to metal elements (Me) in precursor when preparting active material |  | — | 1.02 | 1.06 | 1.02 |
| Physical property of active material particle | Content of element M | ppm | 5500 | 5500 | 5500 |
|  | Particle size D10 of secondary particle | μm | 6.9 | 9.1 | 8.0 |
|  | Particle size D50 of secondary particle | μm | 12.2 | 12.2 | 12.2 |
|  | Ratio of D50/D10 |  | 1.77 | 1.34 | 1.53 |
|  | Average crystallite size | nm | 154 | 193 | 180 |
|  | Pellet density (2.5 ton) | g/cc | 2.93 | 3.19 | 3.02 |

Figure 9:
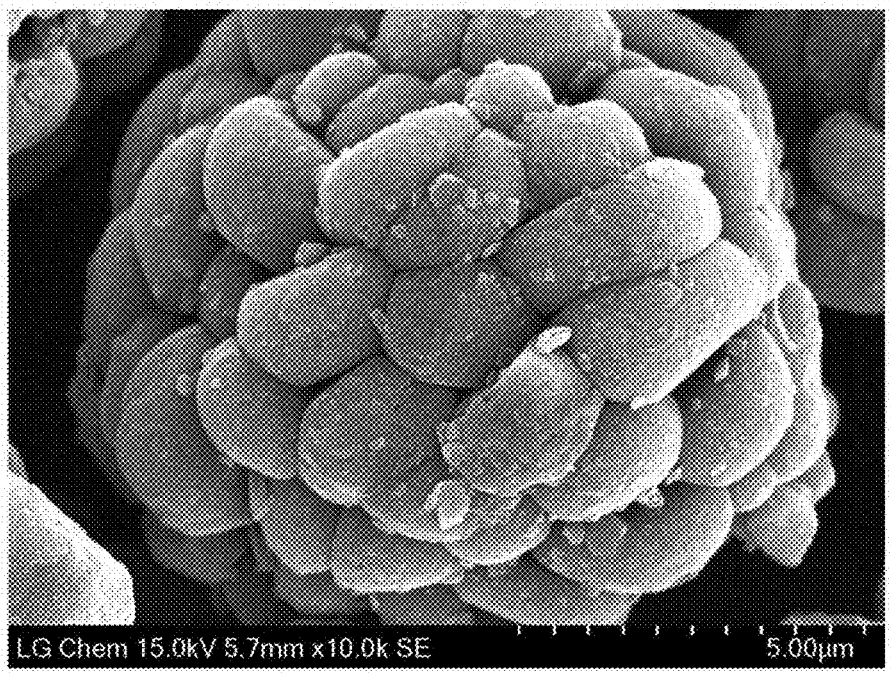
Figure 10:
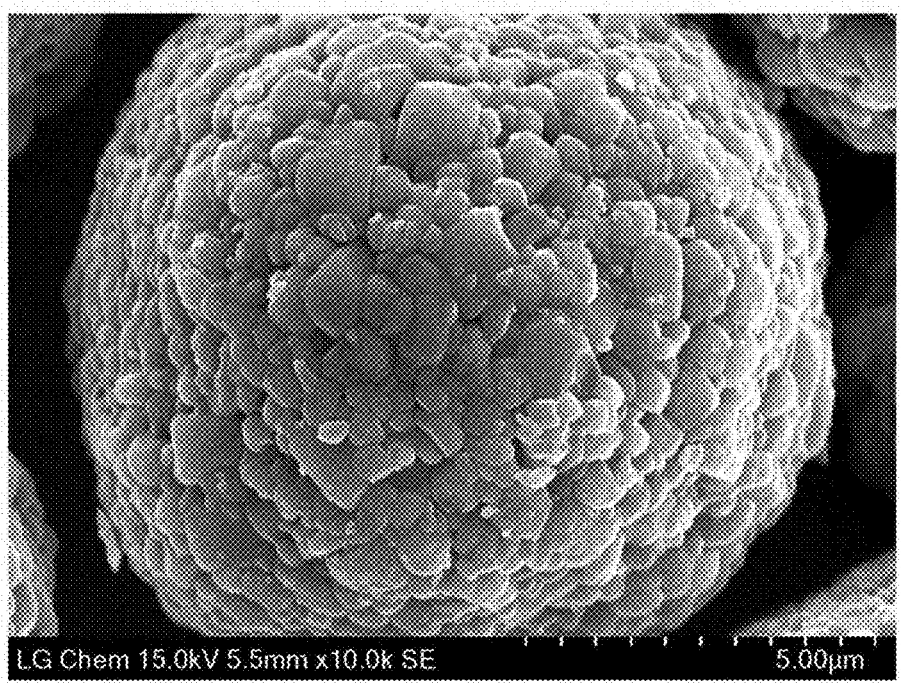
FIG. 10 is a photograph obtained with the SEM of a positive electrode active material prepared in Comparative Example 6.
Figure 11:
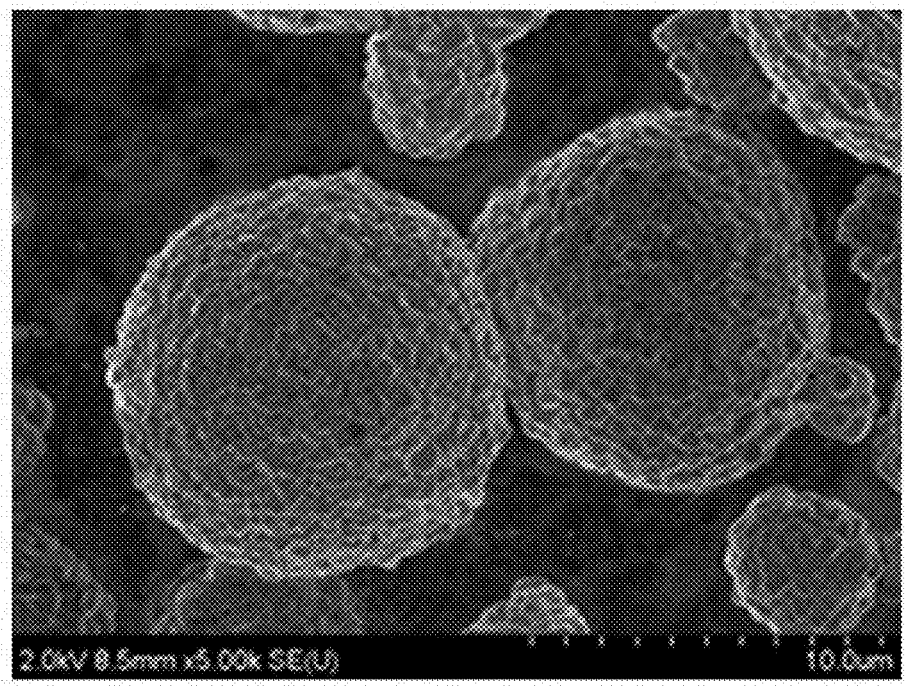
FIGS. 11 and 12 are photographs obtained with the SEM of the positive electrode active materials prepared in Comparative Examples 7 and 8.
Figure 12:
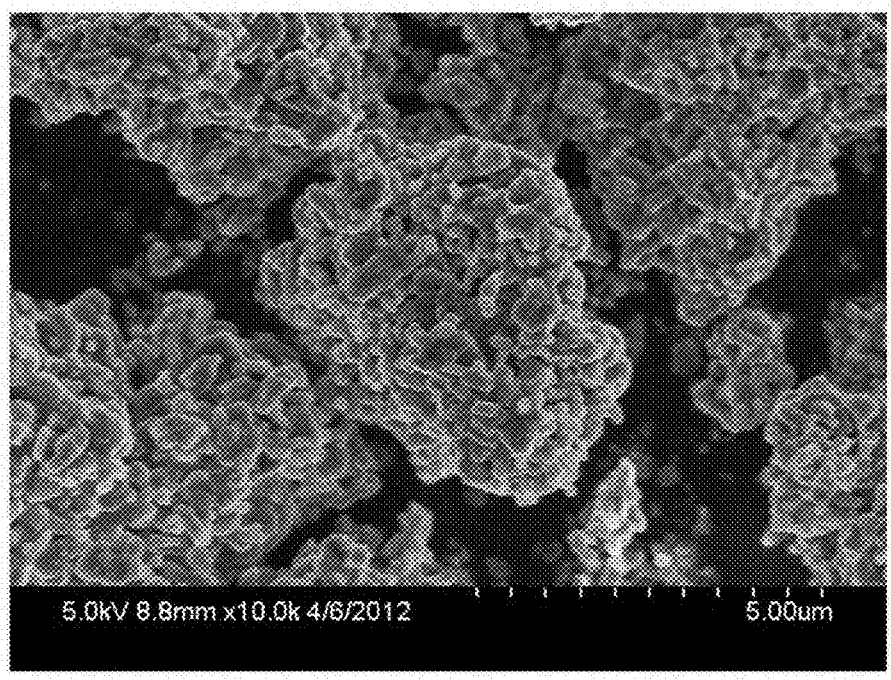
Figure 13A:
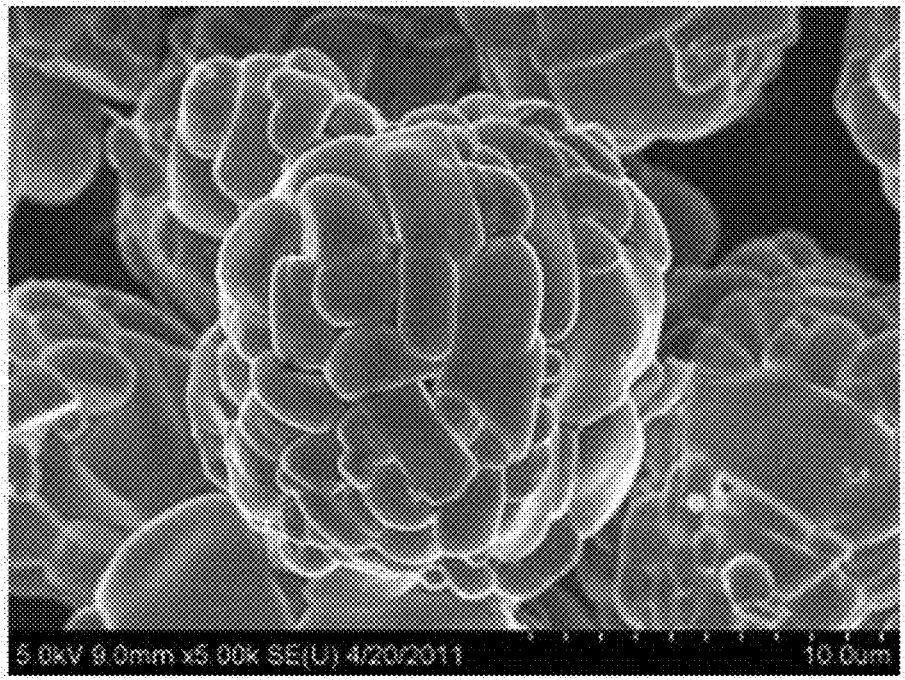
FIGS. 13A to 13C are photographs obtained with the SEM of the positive electrode active materials prepared in Comparative Example 9 at various magnifications.
Figure 13B:
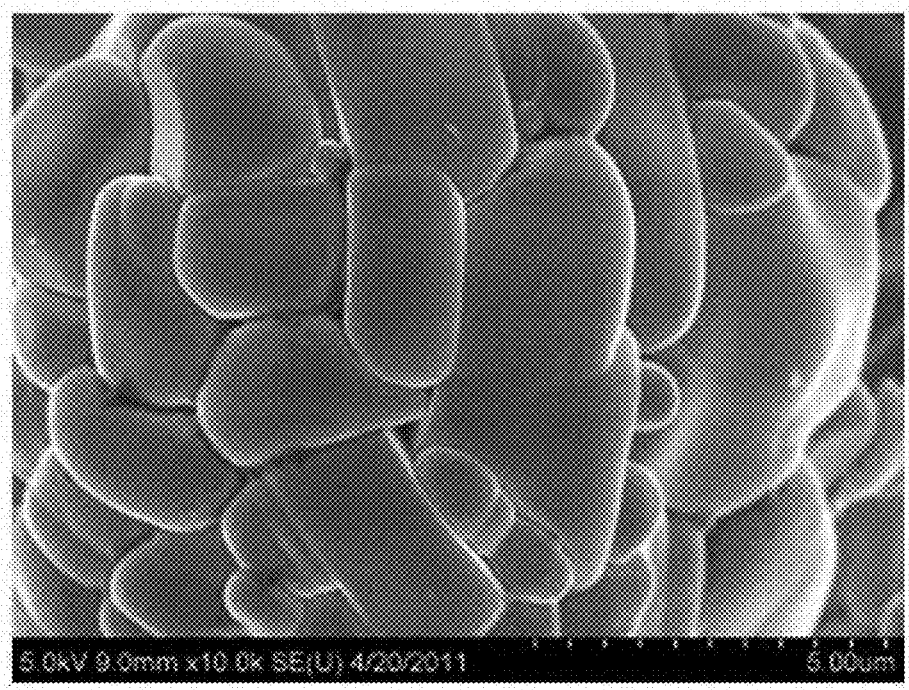
Figure 13C:
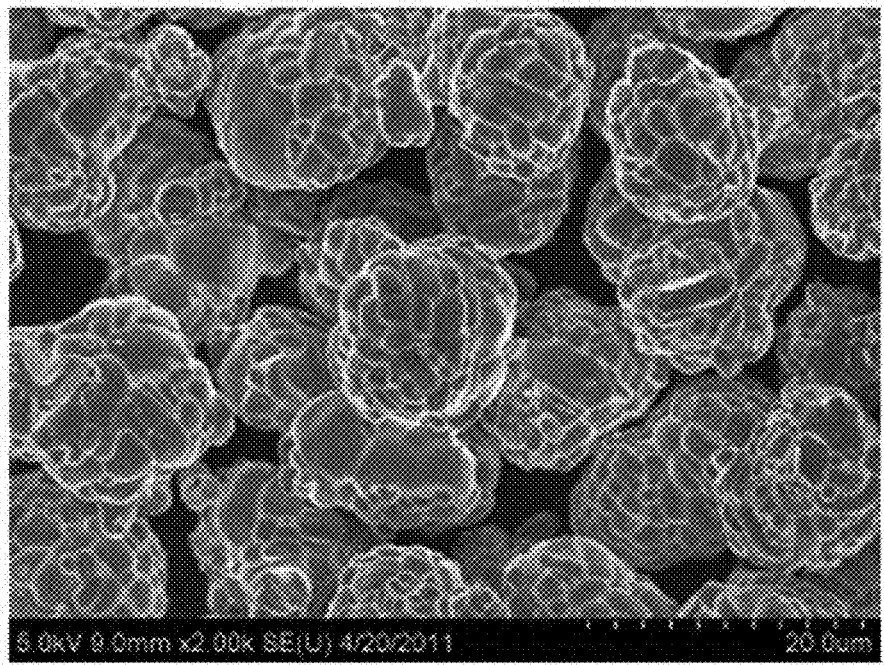

It was confirmed from the results as shown in FIGS. 9 and 10 together with Table 4 that each of the particle sizes of the secondary particles excessively calined at 960° C. or more in Example 1 and 4 was almost the same as the particle size of the secondary particle excessively calined at 950° C. or less in Comparative Example 6. However, each of the average crystallite sizes of primary particles constituting the secondary particle in Example 1 and 4 was significantly increased in comparison to Comparative Example 6. As a result, it was confirmed from the results that high pellet densities in Example 1 and 4 were exhibited. Therefore, it is appreciated that an energy density per volume may be increased when the active material of Example 1 or 4 is applied to the battery. In addition, the crystallite size and the pellet density were more increased in Example 1 in which the mole ratio (mole ratio of Li/Me) of lithium in the lithium raw material to the metal elements (Me) in the precursor is 1.05 or more when mixing the lithium raw material and the precursor in comparison to Example 4 in which the Li/Me mole ratio is 1.02. It was confirmed from the results that the particle size or crystallite size of the primary particle may be additionally controlled through control in the excessive calcination process and the mixing ratio when mixing the lithium raw material and the precursor.

Experimental Example 5: High-Voltage Battery Performance Evaluation

The positive electrode active materials prepared in Examples 1 to 3 and Comparative Examples 1, 2, and 5 were analyzed, and further, a composition for forming a positive electrode was prepared by using the positive electrode active material and a lithium secondary battery was manufactured by using the positive electrode active material, and then battery performance was evaluated. The results are shown in Table 5.

TABLE 5

|  |  | Unit | Example 1 | Example 2 | Example 3 | Comparative Example 1 | Comparative Example 2 | Comparative Example 5 |
|---|---|---|---|---|---|---|---|---|
| Treatment condition | Whether or not excessive calcination is applied |  | ○ | ○ | ○ | X | ○ | ○ |
|  | Whether or not secondary particle is formed |  | ○ | ○ | ○ | X | ○ | ○ |

TABLE 5-continued

| | | Unit | Example 1 | Example 2 | Example 3 | Comparative Example 1 | Comparative Example 2 | Comparative Example 5 |
|---|---|---|---|---|---|---|---|---|
| | (Whether or not particle size is increased) | | | | | | | |
| | Whether or not doping is performed | | ○ | ○ | ○ | ○ | X | ○ |
| Physical property of active material particle | Content of element M | ppm | Zr 5500 | Zr 3500 Mg 500 Ti 250 | Zr 5500/ Al 1000 | Zr 3500 Mg 500 Ti 250 | — | Zr 7500 |
| | Particle size D10 of primary particle | μm | 2.4 | 2.7 | 2.5 | 1.8 | 2.7 | 2.4 |
| | Particle size D10 of secondary particle | μm | 9.1 | 8.9 | 9.0 | 3.7 | 8.9 | 9.0 |
| | Particle size D50 of secondary particle | μm | 12.2 | 11.7 | 12.1 | 4.6 | 12.8 | 12.0 |
| | Ratio of D50/D10 | | 1.34 | 1.31 | 1.34 | 1.24 | 1.44 | 1.33 |
| | BET specific surface area | m$^2$/g | 0.302 | 0.292 | 0.325 | 0.570 | 0.357 | 0.308 |
| | Excess Li in positive electrode active material (Excess Li) | wt % | 0.197 | 0.157 | 1.75 | 0.170 | 0.187 | 0.208 |
| | Pellet density (2.5 ton) | g/cc | 3.19 | 3.18 | 3.17 | 2.75 | 3.25 | 3.14 |
| | Average crystallite size | nm | 193 | 218 | 195 | 146 | 213 | 188 |
| Evaluation of charging and discharging characteristic in 4.40 V coin half cell | 1$^{st}$ 0.2 C charge capacity | mAh/g | 194.7 | 195.2 | 194.5 | 198.2 | 194.8 | 193.8 |
| | 1$^{st}$ 0.2 C discharge capacity | mAh/g | 174.2 | 175.3 | 174.0 | 181.9 | 173.6 | 169.5 |
| | Charging and discharging efficiency at 1$^{st}$ cycle | % | 89.5 | 89.8 | 89.5 | 91.8 | 89.1 | 87.5 |
| Evaluation of high temperature characteristic in 4.35 V full cell | High temperature retention | % | 90.5 | 90.8 | 90.4 | 82.1 | 85.2 | 87.2 |
| | Gas generation amount at high temperature storage | μL/g | 54 | 62 | 45 | 121 | 95 | 52 |
| | Elution amount of metal | ppm | 197 | 185 | 182 | 460 | 272 | 192 |

In the active material of Example 1 having all technical configurations of excessive calcination of the precursor particle, formation of the secondary particle of the active material, and doping, excellent high-voltage battery performance improvement effect was exhibited. In detail, in comparison to Comparative Example 1, high temperature lifespan retention was increased when applied to a high-voltage (4.35 V) full cell and the gas generation amount and the elution amount of metal were decreased, as the active material has a single particle shape due to excessive calcination of the precursor particle. In addition, it can be confirmed that battery performance of Example 1 is further improved when applied to 4.35 V full cell by Zr doping in comparison to Comparative Example 2.

In addition, in the case of Comparison Example 5 which has all technical configurations of excessive calcination of the precursor particle, formation of the secondary particle of the active material, and doping, and in which a doping amount is excessive, the average crystallite size was decreased and the excess Li in the active positive electrode material was increased in comparison to Examples 1 to 3, and charging and discharging efficiency at 1$^{st}$ cycle and high temperature lifespan retention at applied to the battery were deteriorated.

Experimental Example 6: Active Material Analysis and Battery Performance Evaluation The positive electrode active materials prepared in Comparative Examples 7 to 9 were observed with a scanning electron microscope (SEM), and the results were shown in FIGS. 11, 12, and 13A to 13C, respectively.

As a result of observation, all the positive electrode active materials of Comparative Examples 7 to 9 showed the secondary particle phase formed by agglomerating the primary particles.

However, it was confirmed that the active material of Comparative Example 7 prepared at a low calcination temperature had the particle size D50 of the primary particle of less than 1 μm, that is, the particle size of the primary particle in the present invention was out of the particle size condition. In addition, in the case of Comparative Example 8 including the excess Mn, the secondary particle was a non-spherical particle and the particle size D50 of the primary particle constituting the secondary particle was less than 0.5 μm, which is significantly small. On the other hand, in the case of Comparative Example 9 including no Mn, the particle size D50 of the primary particle was significantly increased as 5 μm.

It was confirmed from the experimental results that it is difficult to implement the active material having the secondary particle phase which satisfies the physical properties of the present invention when the excessive calcination temperature condition or the Mn content condition in the present invention is not satisfied at the time of preparing the lithium composite metal oxide.

Figure 14:
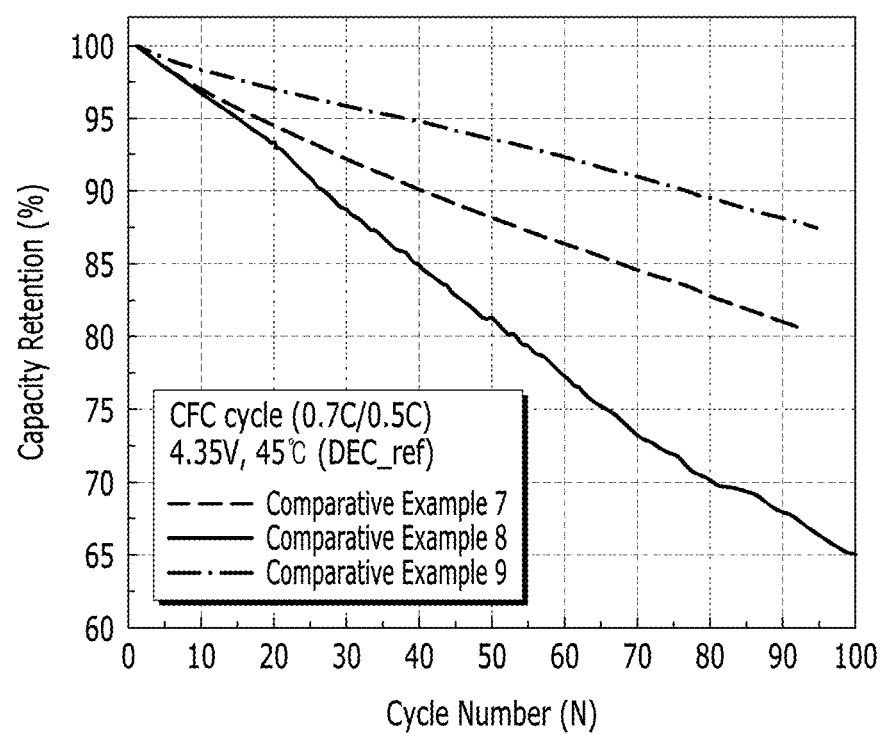

Additionally, a lithium secondary battery was manufactured by using each of the positive electrode active materials prepared in Comparative Examples 7 to 9 in the same manner as in 8) Evaluation of high temperature lifespan characteristic in 4.35 V full cell. The lithium secondary battery was charged up to 4.35 V/38 mA with 0.7 C under a constant current/constant voltage (CC/CV) condition at 45° C., and then discharged down to 3.0 V with 0.5 C under a constant current (CC), and the discharge capacity was measured. The charging and discharging defined as one cycle was repeated for 100 cycles. A value calculated from (capacity after $100^{th}$ cycle/capacity after $1^{st}$ cycle)×100 was represented as high temperature capacity retention (%). The results were shown in FIG. 14.

As a result of the experiment, in comparison to the batteries including the positive electrode active materials of Examples 1 to 3 exhibited 90% or more of high capacity retention in the high-voltage battery performance evaluation of Experimental Example 5, significantly reduced capacities and capacity retentions were exhibited in Comparative Example 7 which does not satisfy the particle size of the primary particle, Comparative Example 8 in which the excess Mn is included, and Comparative Example 9 in which no Mn is included. It was confirmed from the results that the positive electrode active materials of Examples exhibit more excellent lifespan characteristics.

Figure 15:
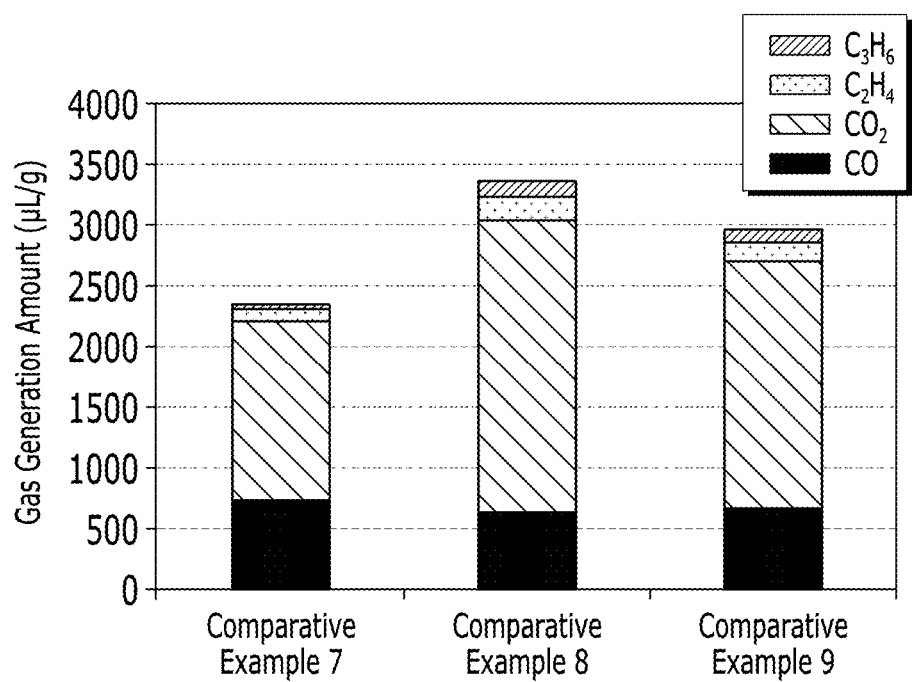

In addition, in the same manner as 9) of a method for measuring a gas generation amount, a coin half cell was prepared using the positive electrode active material prepared in Comparative Examples 7 to 9 and a gas generation amount and a generated gas when the prepared coin half cell is stored at a high temperature of 60° C. for two weeks were analyzed using a gas chromatography (GC). The results were shown in FIG. 15.

In the results of high-voltage battery performance of Experimental Example 5, in comparison to Examples 1 to 3 in which the gas generation amount was significantly reduced to 200 ppm or less, a large amount of gas generation of about 2,000 μl/g or more was each exhibited in Comparative Example 7 in which the particle size of the primary particle is not satisfied, Comparative Example 8 in which the excess Mn is included, and Comparative Example 9 in which no Mn is included. In particular, the largest amount of gas generation of 3,000 μl/g or more was exhibited in Comparative Example 8 in which the excess Mn is included.

It was appreciated from the experimental results that more excellent high temperature lifespan characteristics and gas generation reduction effect are exhibited through control in the size condition of the particle size of the primary particle and the content of Mn.

The invention claimed is:

1. A positive electrode active material for a lithium secondary battery, the positive electrode active material comprises a secondary particle formed by agglomerating a plurality of polycrystalline primary particles comprising a lithium composite metal oxide of Chemical Formula 1,
   wherein the lithium composite metal oxide of Chemical Formula 1 has a layered crystal structure,
   wherein an average crystallite size of the primary particles is 180 to 400 nm, a particle size D50 of the primary particle is 1.5 to 3 μm, and the primary particle is doped or surface-coated with at least one element M selected from the group consisting of Al, Ti, Mg, Zr, Y, Sr, and B in an amount of 3,800 to 7,000 ppm,
   wherein a particle size D10 of the secondary particle is 8 μm or more, wherein a particle size D50 of the secondary particle is 10 to 16 μm, and a ratio of D50/D10 is 1.25 to 1.55:

$$Li_a(Ni_xMn_yCo_zA_w)O_{2+b}$$ 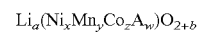 [Chemical Formula 1]

in Chemical Formula 1,
   A is at least one element selected from the group consisting of W, V, Cr, Nb, and Mo, and
   $0.95 \leq a \leq 1.2$, $0 \leq b \leq 0.02$, $0 < x < 1$, $0 < y \leq 0.4$, $0 < z < 1$, $0 \leq w < 0.2$, and $x+y+z+w=1$.

2. The positive electrode active material of claim 1, wherein in Chemical Formula 1, $a=1$, $0 \leq b \leq 0.02$, $0.5 < x < 1$, $0.1 \leq y < 0.4$, $0.1 \leq z < 0.4$, $0 \leq w \leq 0.05$, and $x+y+z+w=1$.

3. The positive electrode active material of claim 1, wherein the lithium composite metal oxide of Chemical Formula 1 is selected from the group consisting of $LiNi_{0.8}Co_{0.1}Mn_{0.1}O_2$, $LiNi_{0.6}Co_{0.2}Mn_{0.2}O_2$, $LiNi_{0.5}Co_{0.2}Mn_{0.3}O_2$, and $LiNi_{0.5}Co_{0.3}Mn_{0.2}O_2$.

4. The positive electrode active material of claim 1, wherein the at least one element M is Zr, Mg, Ti, or Al.

5. The positive electrode active material of claim 1, wherein the particle size D50 of the primary particle is 2 to 3 μm.

6. The positive electrode active material of claim 1, wherein the at least one element M is doped or doped and surface-coated in an amount of 4,000 to 6,500 ppm based on a total weight of the positive electrode active material.

7. The positive electrode active material of claim 1, wherein a specific surface area of the positive electrode active material is 0.25 to 0.39 m²/g, a pellet density of the positive electrode active material is 3 to 5 g/cc, and a content of an excess lithium based on a total weight of the positive electrode active material is 0.15 to 0.2 wt %.

8. The positive electrode active material of claim 1, wherein a particle size D10 of the secondary particle is 8 to 10 μm.

9. A method for preparing the positive electrode active material for a lithium secondary battery of claim 1, comprising:

mixing a precursor for preparation of a lithium composite metal oxide of Chemical Formula 1 with a lithium raw material and a raw material of an element M, wherein the element M is at least one element selected from the group consisting of Al, Ti, Mg, Zr, Y, Sr, and B, and excessively calcining the mixture at a temperature of 960° C. or more;

wherein a particle size D50 of the precursor is 8 μm or more:

$$Li_a(Ni_xMn_yCo_zA_w)O_{2+b}$$ [Chemical Formula 1]

in Chemical Formula 1, A is at least one element selected from the group consisting of W, V, Cr, Nb, and Mo, and 0.95≤a≤1.2, 0≤b≤0.02, 0<x<1, 0<y≤0.4, 0<z<1, 0≤w<0.2, and x+y+z+w=1.

10. The method of claim 9, wherein the particle size D50 of the precursor is 8 to 12 μm.

11. The method of claim 9, wherein the precursor and the lithium raw material are mixed so that a mole ratio of lithium (Li) included in the lithium raw material to a total number of moles of metal elements in the precursor, not including lithium, is 1.05 to 1.2.

12. The method of claim 9, wherein the excessively calcining is performed at 990 to 1,050° C.

13. The method of claim 9, wherein the raw material of the element M is further added and the mixture is excessively calcined when the precursor and the lithium raw material are mixed before the lithium composite metal oxide is mixed with the raw material of the element M and the heat treatment is performed.

14. A method for preparing the positive electrode active material for a lithium secondary battery of claim 1, comprising mixing a precursor for preparation of a lithium composite metal oxide of Chemical Formula 1 with a lithium raw material, excessively calcining the mixture at a temperature of 960° C. or more, mixing the lithium composite metal oxide thus obtained with a raw material of an element M, wherein the element M is at least one element selected from the group consisting of Al, Ti, Mg, Zr, Y, Sr, and B, and performing a heat treatment at a temperature of 200 to 800° C. forming a coated layer including the element M, wherein a particle size D50 of the precursor is 8 to 12 μm:

$$Li_a(Ni_xMn_yCo_zA_w)O_{2+b}$$ [Chemical Formula 1]

wherein, A is at least one element selected from the group consisting of W, V, Cr, Nb, and Mo, and 0.95≤a≤1.2, 0≤b≤0.02, 0<x<1, 0<y≤0.4, 0<z<1, 0≤w<0.2, and x+y+z+w=1.

15. The method of claim 14, wherein the excessively calcining is performed at 990 to 1,050° C.

16. A positive electrode for a lithium secondary battery comprising the positive electrode active material of claim 1.

17. A lithium secondary battery comprising the positive electrode active material of claim 1.

* * * * *